(12) United States Patent
Fukushima

(10) Patent No.: US 9,172,839 B2
(45) Date of Patent: Oct. 27, 2015

(54) IMAGE FORMING APPARATUS, CONTROL METHOD AND STORAGE MEDIUM

(71) Applicant: Kimihiro Fukushima, Kanagawa (JP)

(72) Inventor: Kimihiro Fukushima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/600,091

(22) Filed: Jan. 20, 2015

(65) Prior Publication Data

US 2015/0207956 A1    Jul. 23, 2015

(30) Foreign Application Priority Data

Jan. 23, 2014  (JP) .................... 2014-010479
May 28, 2014  (JP) .................... 2014-110500

(51) Int. Cl.
*H04N 1/04* (2006.01)
*H04N 1/21* (2006.01)
*G06F 13/28* (2006.01)

(52) U.S. Cl.
CPC .............. *H04N 1/21* (2013.01); *G06F 13/28* (2013.01); *H04N 2201/0094* (2013.01)

(58) Field of Classification Search
CPC ... H04N 1/21; H04N 2201/0094; G06F 13/28
USPC ................... 358/1.16, 1.15, 1.9, 474
See application file for complete search history.

(56) References Cited

U.S. PATENT DOCUMENTS

| | | | |
|---|---|---|---|
| 7,319,548 B2 * | 1/2008 | Ohta | ............................. 358/1.9 |
| 7,966,440 B2 | 6/2011 | Namba | |
| 2008/0170257 A1 * | 7/2008 | Fukuda | ....................... 358/1.15 |
| 2013/0246833 A1 | 9/2013 | Fukushima | |
| 2014/0101347 A1 * | 4/2014 | Chandhoke et al. | ............ 710/26 |

FOREIGN PATENT DOCUMENTS

| | | |
|---|---|---|
| JP | H11-341241 | 12/1999 |
| JP | 2008-310798 | 12/2008 |

* cited by examiner

*Primary Examiner* — Houshang Safaipour
(74) *Attorney, Agent, or Firm* — Harness, Dickey & Pierce, P.L.C.

(57) ABSTRACT

An image forming apparatus includes a first device to which a first memory is connected; a second device to which a second memory is connected; and a third device to which a third memory is connected. The third device includes a data transfer control unit configured to perform data transfers each for transferring data from one of the first to third memories to a destination memory of the first to third memories, according to direct memory access control in cooperation with the first device and according to an instruction received from the second device. Priorities and orders are assigned to the data transfers. The data transfer control unit arbitrates the data transfers by changing the orders of the data transfers based on the priorities assigned to the data transfers and by changing the destination memory of at least one of the data transfers.

11 Claims, 21 Drawing Sheets

IMAGE FORMING APPARATUS, CONTROL METHOD AND STORAGE MEDIUM

BACKGROUND OF THE INVENTION

1. Field of the Invention

The disclosures herein generally relate to an image forming apparatus, a control method and a storage medium. Especially, the present invention relates to an image forming apparatus provided with a data transfer function according to direct memory access control for image data between various types of memories connected to various types of devices, such as an engine ASIC (Application Specific Integrated Circuit), a controller ASIC or a processor, a control method for transferring the data for image formation processing and a storage medium.

2. Description of the Related Art

Conventionally, an image forming apparatus with a specification of multifunction peripheral (MFP), i.e. a digital multifunction peripheral, in which plural functions, such as a printer function, a copying function, a scanner function or a facsimile function are combined into a single chassis, is generally configured so that an engine ASIC is connected to a controller ASIC and instruction control for image formation processing is performed from a processor (CPU: central processing unit), which controls an entire apparatus connected to the controller ASIC, via the controller ASIC. For example, a configuration has been known, in which the controller ASIC and the engine ASIC are connected via a PCI interface, a PCI Express (hereinafter, referred to as PCIe) interface or the like, and the controller ASIC and the processor are directly connected by the PCIe interface or connected via a chipset.

Related art for the well-known art area includes, for example, Japanese Published Patent Application No. 2008-310798, disclosing an image processing controller and an image forming apparatus, in which a data transfer path using both PCI interface and PCIe interface can be controlled.

In the related art described in Japanese Published Patent Application No. 2008-310798, in order to improve data transfer performance for image data among the engine ASIC, the controller ASIC and the processor (CPU), availability is enhanced by providing plural interfaces including a PCI interface and a PCIe interface, and the data transfer path using the plural interfaces, such as the PCI interface and the PCIe interface can be controlled. However, a control means for the data transfer path does not take account of priority, so that when the data transfer of image data by the direct memory access control is performed among various types of memories connected to the engine ASIC, the controller ASIC and the processor, the data transfer is not always performed efficiently. Accordingly, there is a problem that a transfer band for other data transfer with higher priority is often reduced.

SUMMARY OF THE INVENTION

It is a general object of at least one embodiment of the present invention to provide an image forming apparatus, a control method for transferring data for image formation processing and a storage medium that substantially obviate one or more problems caused by the limitations and disadvantages of the related art.

In one embodiment, an image forming apparatus includes a first device to which a first memory is connected; a second device to which a second memory is connected; and a third device to which a third memory is connected. The third device includes a data transfer control unit configured to perform data transfers each for transferring data from one of the first to third memories to a destination memory of the first to third memories, according to direct memory access control in cooperation with the first device and according to an instruction received from the second device. Priorities and orders are assigned to the data transfers. The data transfer control unit arbitrates the data transfers by changing the orders of the data transfers based on the priorities assigned to the data transfers and by changing the destination memory of at least one of the data transfers.

In another embodiment, a control method controls data transfers each for transferring data from one of a first memory connected to a first device, a second memory connected to a second device and a third memory connected to a third device to a destination memory of the first to third memories, according to direct memory access control in cooperation with the first device and according to an instruction received from the second device, by a data transfer control unit provided in the third device. Priorities and orders are assigned to the data transfers. The method includes arbitrating the data transfers by changing the orders of the data transfers based on the priorities assigned to the data transfers and by changing the destination memory of at least one of the data transfers.

In yet another embodiment, a non-transitory computer-readable storage medium stores a program for causing a computer to perform a process of controlling data transfers each for transferring data from one of a first memory connected to a first device, a second memory connected to a second device and a third memory connected to a third device to a destination memory of the first to third memories, according to direct memory access control in cooperation with the first device and according to an instruction received from the second device. Priorities and orders are assigned to the data transfers. The process includes an arbitration step of arbitrating the data transfers by changing the orders of the data transfers based on the priorities assigned to the data transfers and by changing the destination memory of at least one of the data transfers.

According to the present invention, regarding the data transfer of image data by the direct memory access control among various types of memories connected to various types of devices, it is determined whether to transfer and an order of the transfer based on a result of comparison of the preliminarily assigned priorities; and data transfer arbitration processing is performed, in which upon executing the direct memory access control, based on a data flow of data transfer, an optimum memory is determined and written to. According to the above, the data transfer can always be performed efficiently without decreasing the transfer band for data transfer with high priority.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

In the following, embodiments of the present invention will be described with reference to the accompanying drawings.

First Embodiment

Figure 1:
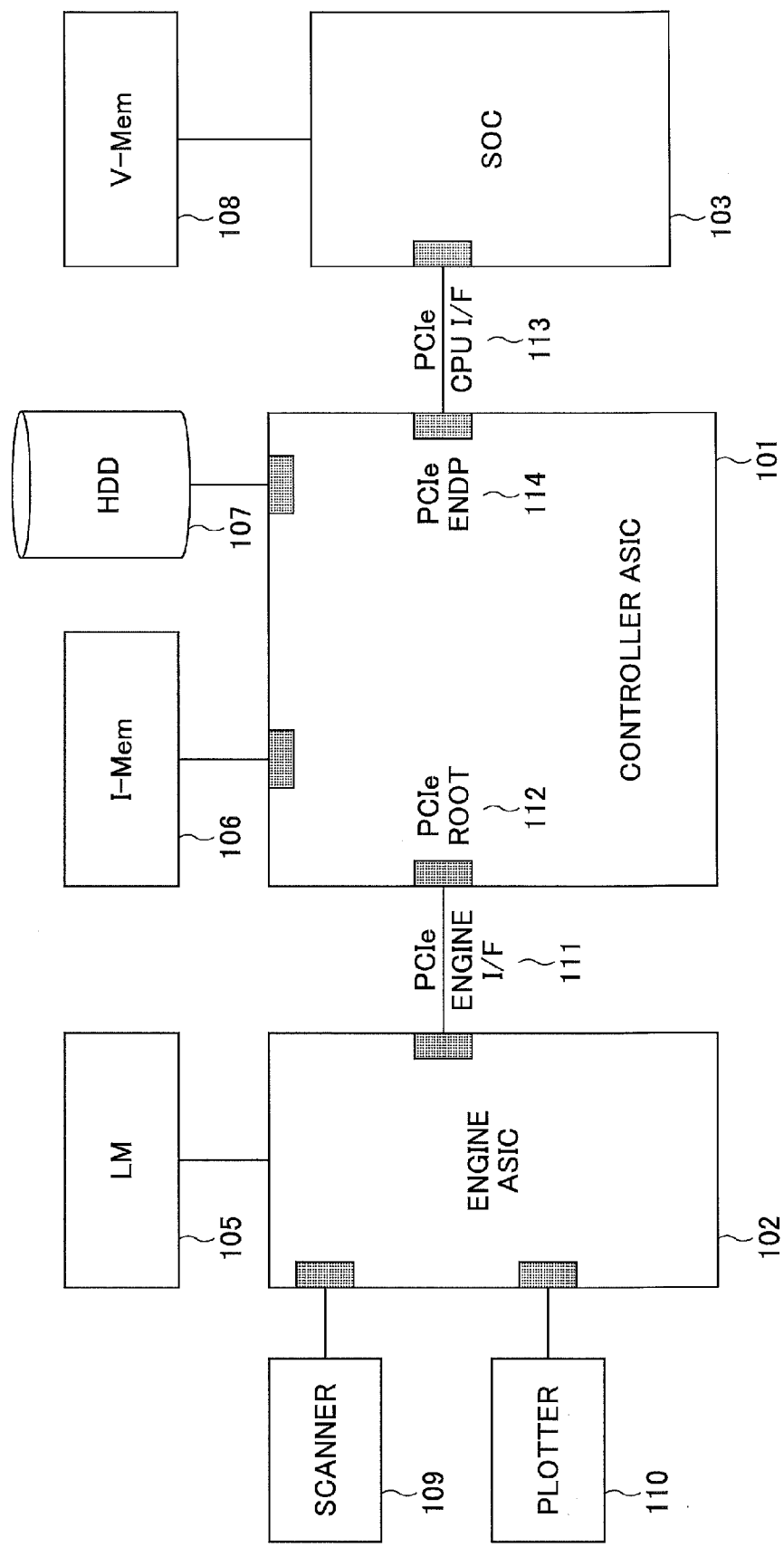
FIG. 1 is a block diagram illustrating an example of a basic configuration of an image forming apparatus according to a first embodiment.

FIG. 1 is a block diagram illustrating a basic configuration of an image forming apparatus according to a first embodiment. The image forming apparatus includes an engine ASIC 102 as a first device, a controller ASIC 101 as a second device, a processor SOC 103 as a third device, and a data transfer control unit (not shown). The engine ASIC 102 is connected to a scanner 109 and a plotter 110, and a local memory (LM) 105 as a first memory is connected to the engine ASIC 102 as a subordinate of control. The controller ASIC 101 is connected to a hard disk drive (HDD) 107, and an image memory (I-Mem) 106 as a second memory is connected to the controller ASIC 101 as a subordinate of control. The controller ASIC 101 includes a PCIe root complex unit (PCIe ROOT) 112 to which the engine ASIC 102 is connected via a PCIe engine I/F 111. To the processor SOC 103, a virtual memory (V-Mem) 108 as a third memory is connected as a subordinate of control. The processor SOC 103 is connected to a PCIe end point unit (PCIe ENDP) 114, which is included in the controller ASIC 101, via a PCIe CPU I/F 113, and performs control of the entire apparatus. The data transfer control unit is provided in the controller ASIC 101 and performs data transfer of image data according to direct memory access control from an arbitrary memory of the local memory (LM) 105, the image memory (I-Mem) 106 and the virtual memory (V-Mem) 108 to another memory.

A case where, out of these, the local memory (LM) 105 is configured with SRAM (static random access memory), and each of the image memory (I-Mem) 106 and the virtual memory (V-Mem) 108 is configured with DDR3 SDRAM (Double-Data-Rate 3 Synchronous Dynamic Random Access Memory) can be illustrated. Moreover, the data transfer control unit performs data transfer arbitration processing for determining whether to transfer and an order of the transfer. The data transfer according to the direct memory access control is performed by cooperating with the engine ASIC 102 receiving instruction control from the processor SOC 103, based on a result of comparison for the preliminarily configured priorities, and by determining an optimum memory upon executing the direct memory access control based on a data flow of data transfer. Specifically, a function of an FDMAC 212, which will be described later (See FIG. 2), in the controller ASIC 101 performs it.

The scanner 109 connected to the above-described engine ASIC 102 is an input device of inputting monochrome or color images. The plotter 110 is an output device of outputting monochrome or color images. Moreover, the local memory (LM) 105 is a memory that temporarily retains image data input by the scanner 109 or image data to be output by the plotter 110.

The virtual memory (V-Mem) 108 connected to the processor SOC 103 is a main memory in which various types of image data or control programs are stored.

Moreover, the image memory (I-Mem) 106 connected to the controller ASIC 101 is a memory that temporarily retains a command list or the like for generating image data, code data or output image data. The hard disk drive (HDD) 107 is a recording medium that retains image data, code data, font data or the like.

Figure 2:
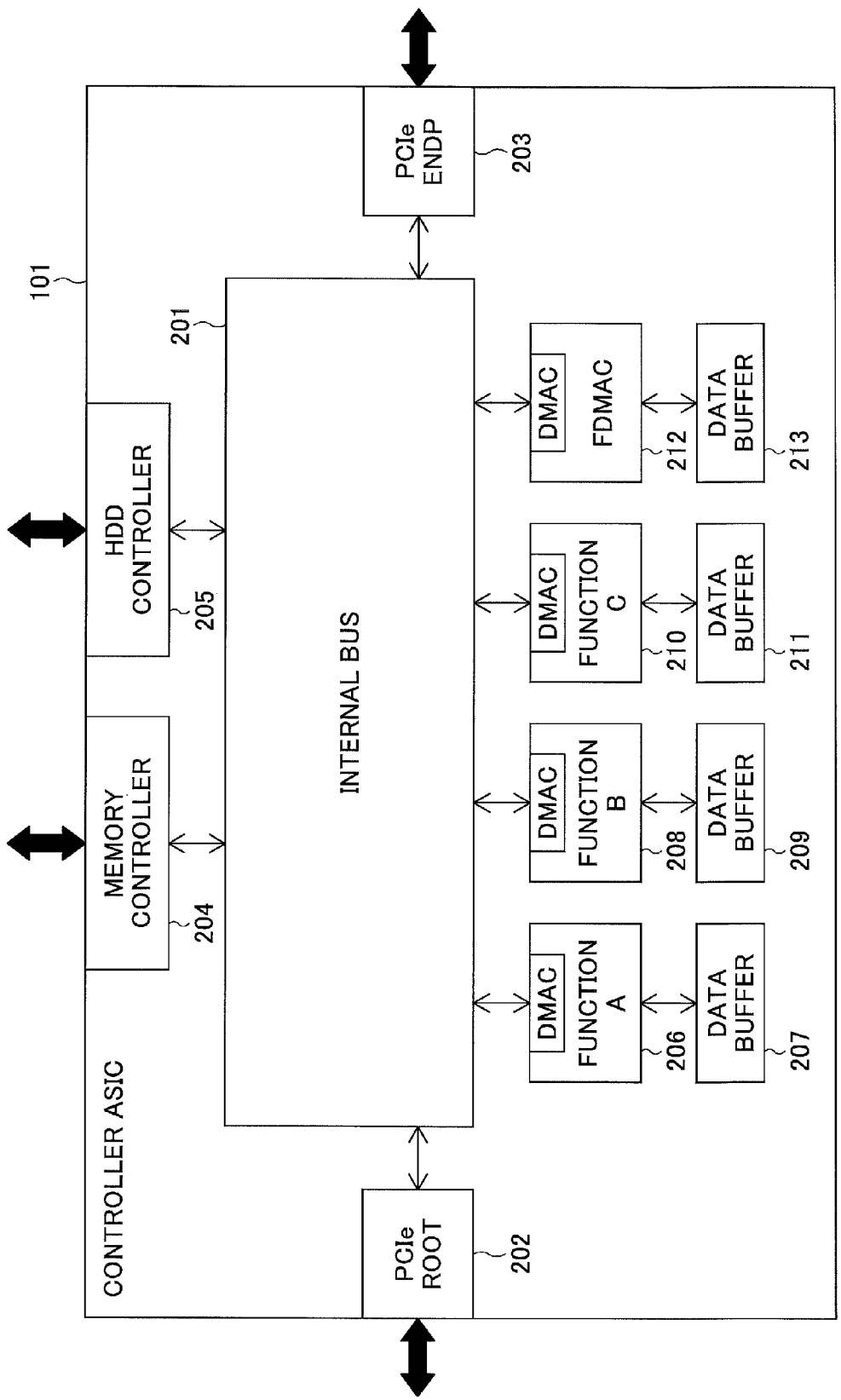
FIG. 2 is a block diagram illustrating an example of a detailed configuration of a controller ASIC provided in the image forming apparatus shown in FIG. 1.

FIG. 2 is a block diagram illustrating a detailed configuration of the controller ASIC 101. The controller ASIC 101 is provided with an internal bus 201. The internal bus 201 is used as a system bus that connects the respective internal function blocks. The internal bus 201 may be configured, other than the illustrated embodiment, by combining plural buses in order to improve data transfer performance.

A PCIe ROOT 202 connected to the internal bus 201 is the same as the above-described PCIe root complex unit (PCIe ROOT) 112 and has a function for connecting the engine ASIC 102 via the PCIe engine I/F 111. Similarly, a PCIe ENDP 203 connected to the internal bus 201 is the same as the above-described PCIe end point unit (PCIe ENDP) 114 and has a function for connecting the processor SOC 103 via the PCIe CPU I/F 113.

Moreover, a memory controller 204 connected to the internal bus 201 is connected to the image memory (I-Mem) 106 and has a function for controlling an interface upon performing data transfer to the image memory (I-Mem) 106. An HDD controller 205 connected to the internal bus 201 is connected to the hard disk drive (HDD) 107 and has a function for controlling an interface upon performing data transfer to the hard disk drive (HDD) 107.

Furthermore, a function A 206, a function B 208, and a function C 210 connected to the internal bus 201 are functional blocks generally representing some processing functions with which the controller ASIC 101 is provided. The processing functions here include, for example, an input unit that inputs image data read by the scanner 109, an output unit that outputs image data to the plotter 110, a compression unit that reads image data from a memory, performs compression processing and writes code data back to the memory, a clearing unit 402 (see FIG. 4) that clears data on a memory by setting them to zero, a drawing unit that performs drawing processing based on a command list, an expansion unit that reads code data, performs expansion processing and writes image data back to the memory, or the like.

Each of the function A 206, the function B 208 and the function C 210, described as above, has a function for performing the direct memory access processing (DMAC). Moreover, a data buffer 207, a data buffer 209 and a data buffer 211 connected to the function A 206, the function B 208 and the function C 210, respectively, are used for temporarily storing image data to be transferred when the data transfer is performed according to the direct memory access control.

Additionally, an FDMAC 212 connected to the internal bus 201 has a function of performing the direct memory access processing (DMAC), and also has a function of performing data transfer for image data according to the direct memory access control among various types of memories arranged in the apparatus. A data buffer 213 connected to this FDMAC 212 is also used for temporarily storing image data to be transferred upon performing the data transfer according to the direct memory access control in the same way as above.

The data transfer among the various types of memories includes, for example, a case of performing data transfer from the virtual memory (V-Mem) 108 to the image memory (I-Mem) 106, a case of performing data transfer from the virtual memory (V-Mem) 108 to the local memory (LM) 105, a case of performing data transfer from the image memory (I-Mem) 106 to the local memory (LM) 105, and their opposite patterns, i.e. a case of performing data transfer from the image memory (I-Mem) 106 to the virtual memory (V-Mem) 108, a case of performing data transfer from the local memory (LM) 105 to the virtual memory (V-Mem) 108, a case of performing data transfer from the local memory (LM) 105 to the image memory (I-Mem) 106 or the like. Furthermore, a memory as a transmission source may be the same as a memory as a transmission destination. Specifically, the data transfer includes a case of performing data transfer from some region in the virtual memory (V-Mem) 108 to another region in the virtual memory (V-Mem) 108, a case of performing data transfer from some region in the image memory (I-Mem) 106 to another region in the image memory (I-Mem) 106 or a case of performing data transfer from some region in the local memory (LM) 105 to another region in the local memory (LM) 105. An order of processing is assigned to each of the data transfers.

Figure 3:
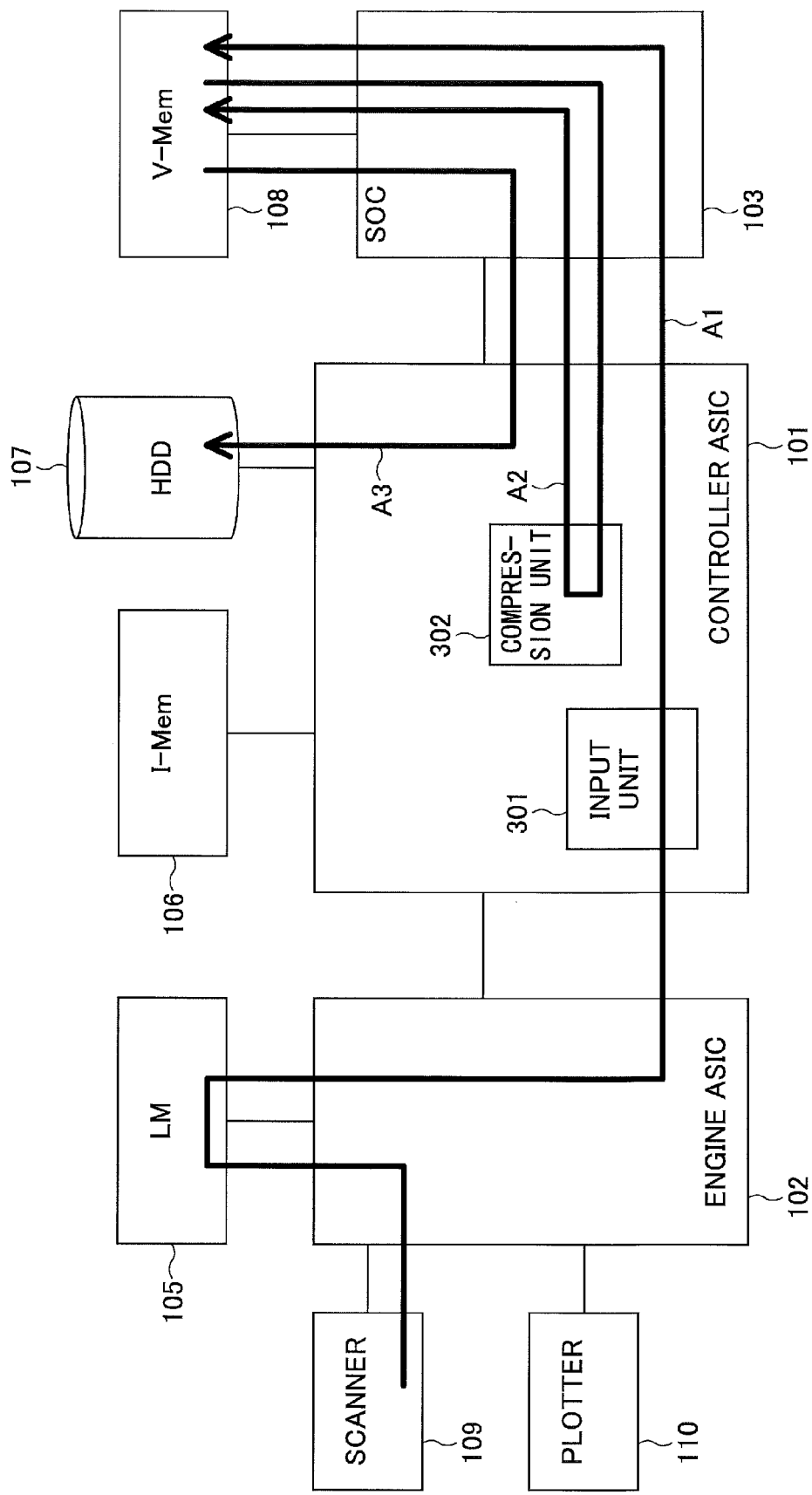
FIG. 3 is a functional block diagram illustrating an example of a flow of data processing, when an image is input from a scanner connected to an engine ASIC provided in the image forming apparatus shown in FIG. 1.

FIG. 3 is a functional block diagram illustrating a flow of data processing when an image is input from the scanner 109 connected to the engine ASIC 102, which is provided in the image forming apparatus according to the first embodiment.

Referring to FIG. 3, in the early stage of the flow of the data processing here, as shown by data flow A1, after image data read by the scanner 109 are stored in the local memory (LM) 105 via the engine ASIC 102, the image data are read by the engine ASIC 102 and transferred to the controller ASIC 101; from the controller ASIC 101 the image data are input to and stored in the virtual memory (V-Mem) 108 by an input unit 301 via the processor SOC 103.

In the next stage, as shown by data flow A2, after the image data once stored in the virtual memory (V-Mem) 108 are read by a compression unit 302 installed in the controller ASIC 101 via the processor SOC 103 and compression processing is performed on the image data, the compressed data are written back, as code data, in the virtual memory (V-Mem) 108 via the processor SOC 103.

Furthermore, in the successive stage, as shown by data flow A3, the code data once stored in the virtual memory (V-Mem) 108 are transferred to the controller ASIC 101 via the processor SOC 101, and the controller ASIC 101 stores the code data in the hard disk drive HDD 107.

During the above-described flow of the data processing upon inputting image data from the scanner 109, for the data flow A1, the data transfer is required to be performed in synchronization with the reading operation by the scanner 109. That is, for scanned image data transferred for each line, the transfer processing is required to be performed within a time period for one line.

Figure 4:
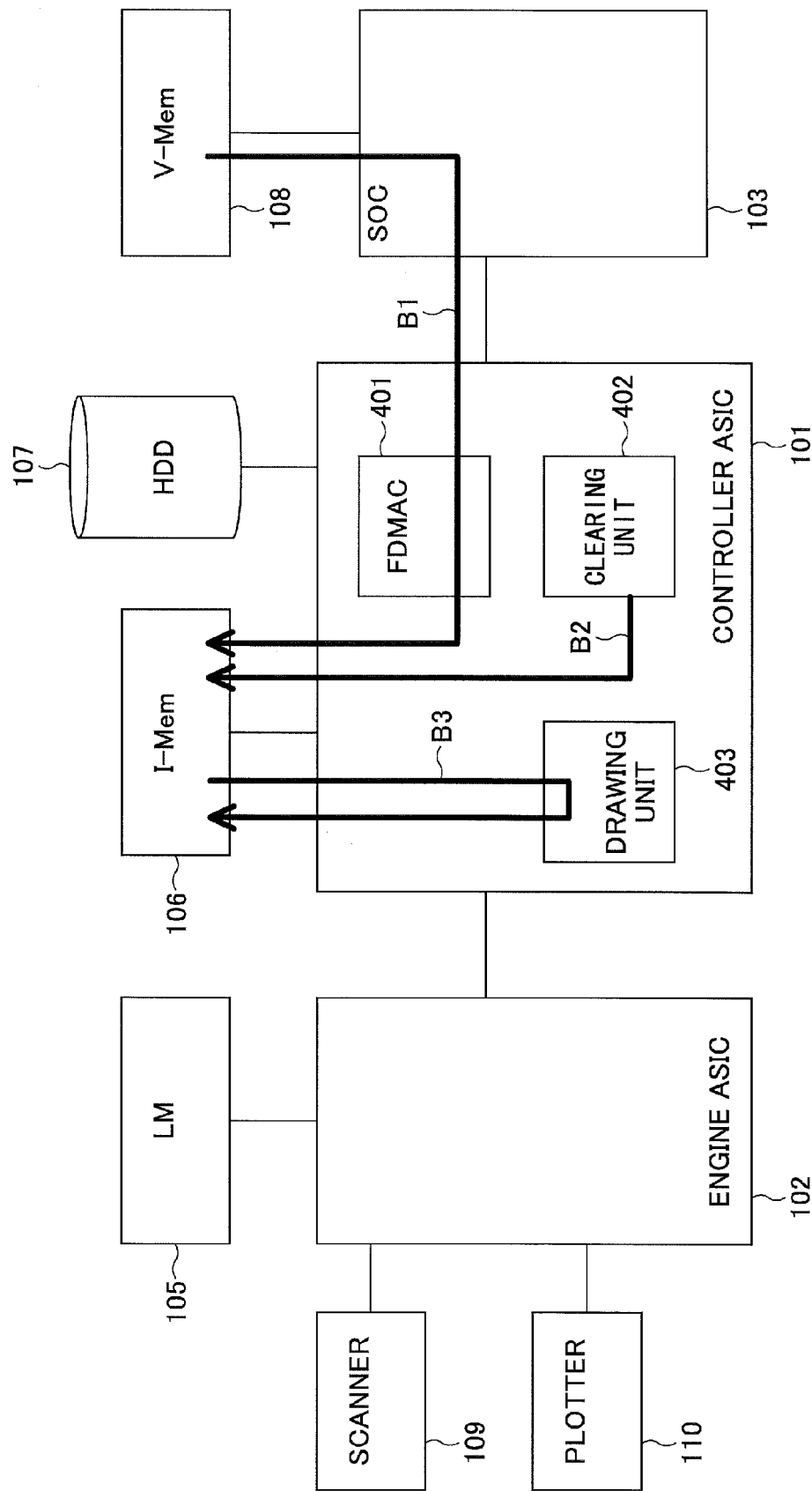
FIG. 4 is a functional block diagram illustrating an example of a flow of data processing of a first half of a printer drawing including data transfer arbitration processing at the controller ASIC provided in the image forming apparatus shown in FIG. 1.

FIG. 4 is a functional block diagram illustrating a flow of data processing of a first half of a printer drawing including data transfer arbitration processing at the controller ASIC 101 provided in the image forming apparatus according to the first embodiment.

Referring to FIG. 4, in the early stage of the flow of the data processing here, as shown by data flow B1, a command list stored in the virtual memory (V-Mem) 108 is read in data transfer arbitration processing by an FDMAC, which is the same as the FDMAC 212 in FIG. 2 installed in the controller ASIC 101, via the processor SOC 103, and is transferred to and stored in the image memory (I-Mem) 106.

In the next stage, as shown by data flow B2, a drawing data developing area in the image memory (I-Mem) 106 is cleared to zero by a clearing unit 402 installed in the controller ASIC 101.

Furthermore, in the successive stage, as shown by data flow B3, drawing data are written by performing drawing for image data in the drawing data developing area in the image memory (I-Mem) 106 by a drawing unit 403 installed in the controller ASIC 101 based on the command list stored in the image memory (I-Mem) 106.

Figure 5:
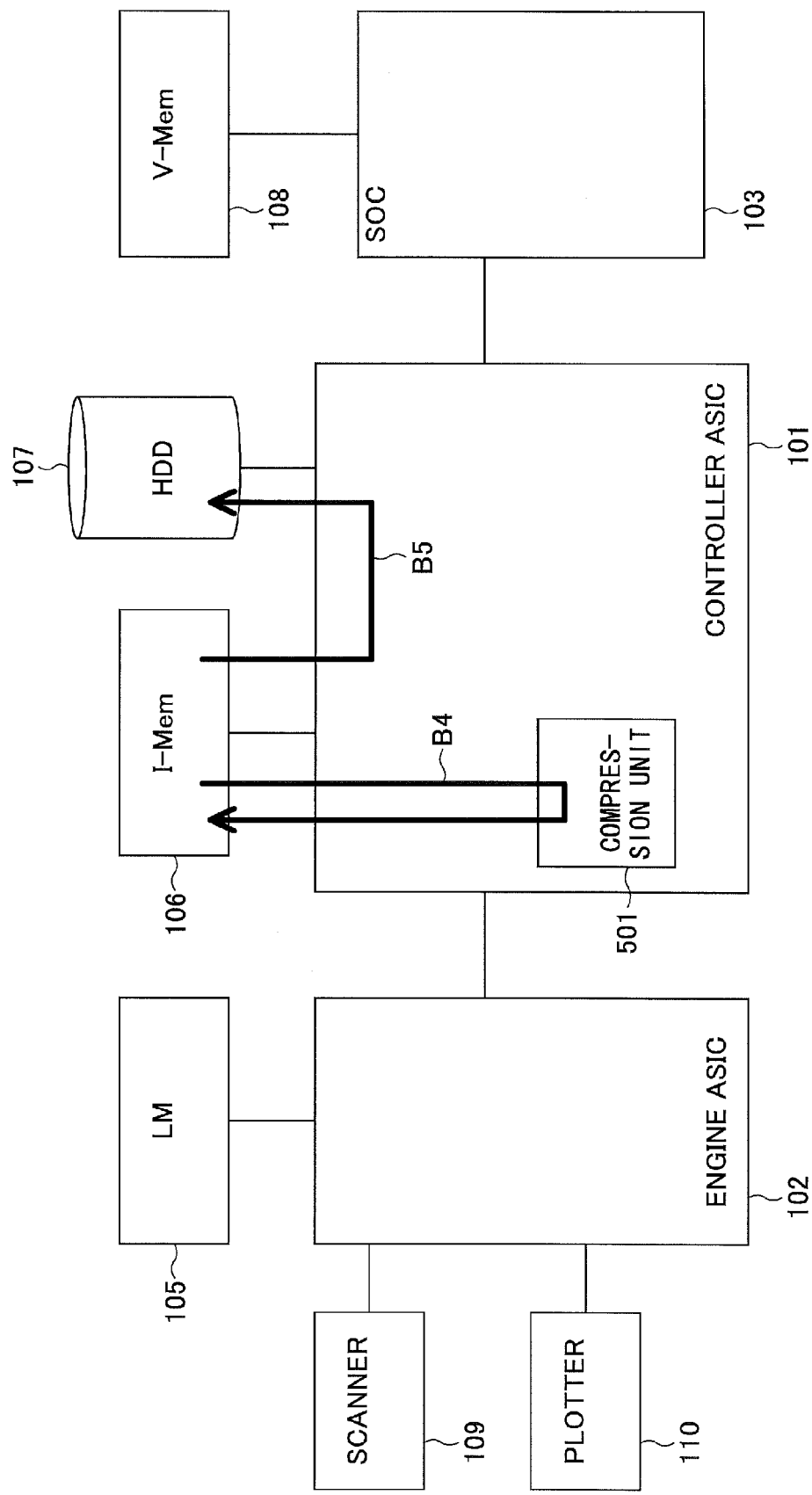
FIG. 5 is a functional block diagram illustrating an example of a flow of data processing of a second half of the printer drawing at the controller ASIC provided in the image forming apparatus shown in FIG. 1.

FIG. 5 is a functional block diagram illustrating a flow of data processing of a second half of the printer drawing at the controller ASIC 101 provided in the image forming apparatus according to the first embodiment.

Referring to FIG. 5, in the early stage of the flow of the data processing here, as shown by data flow B4, the drawing data drawn in the drawing data developing area in the image memory (I-Mem) 106 are read by a compression unit 501 installed in the controller ASIC 101, compression processing is performed on the drawing data, and the compressed data are, as code data, written back to the image memory (I-Mem) 107.

In the next stage, as shown by data flow B5, the controller ASIC 101 transfers the code data once stored in the image memory (I-Mem) 106 to the hard disk drive (HDD) 107 and stores the code data in the HDD.

Here, assume that the flow of data processing upon imputing image from the scanner 109, shown in FIG. 3 and the flow of data processing of printer drawing, shown in FIGS. 4 and 5 occur at the same time. Since both the data flow A1 by the input unit 301 and the data flow B1 by the FDMAC 401 are required to pass through the PCIe CPU I/F 113 connecting the controller ASIC 101 and the processor SOC 103, competition occurs. As described above, the data flow A1 by the input unit 301 is required to perform the transfer processing for scanned image data transferred for each line within the time period for one line in the scanner 109. When the transfer processing is inhibited by another factor of transfer, a data overrun error may occur.

Therefore, the FDMAC 401, which is to execute data flow B1, grasps the status of such competition in the data transfer arbitration processing, and by shifting the timing of execution of the data flow B1, the operation processing of the data flow A1 is controlled so as not to be inhibited, and the occurrence of the data overrun error is prevented. Incidentally, priority of the data transfer according to the direct memory access control is preliminarily determined. When completion in the memory access occurs, the direct memory access control is performed in order of the priority. For example, high priority is assigned preliminarily to the input unit 301 which is required to acquire image data for each line in synchronization with the readout operation of the scanner 109 and to transfer the data. On the other hand, low priority is assigned preliminarily to the compression unit 302, which reads image data from the virtual memory (V-Mem) 108, performs the compression processing for the image data and writes the compressed data back to the virtual memory (V-Mem) 108. Thus, when competition occurs in the memory access between the input unit 301 and the compression unit 302, a memory access privilege is given to the input unit 301 which has higher priority.

Figure 6:
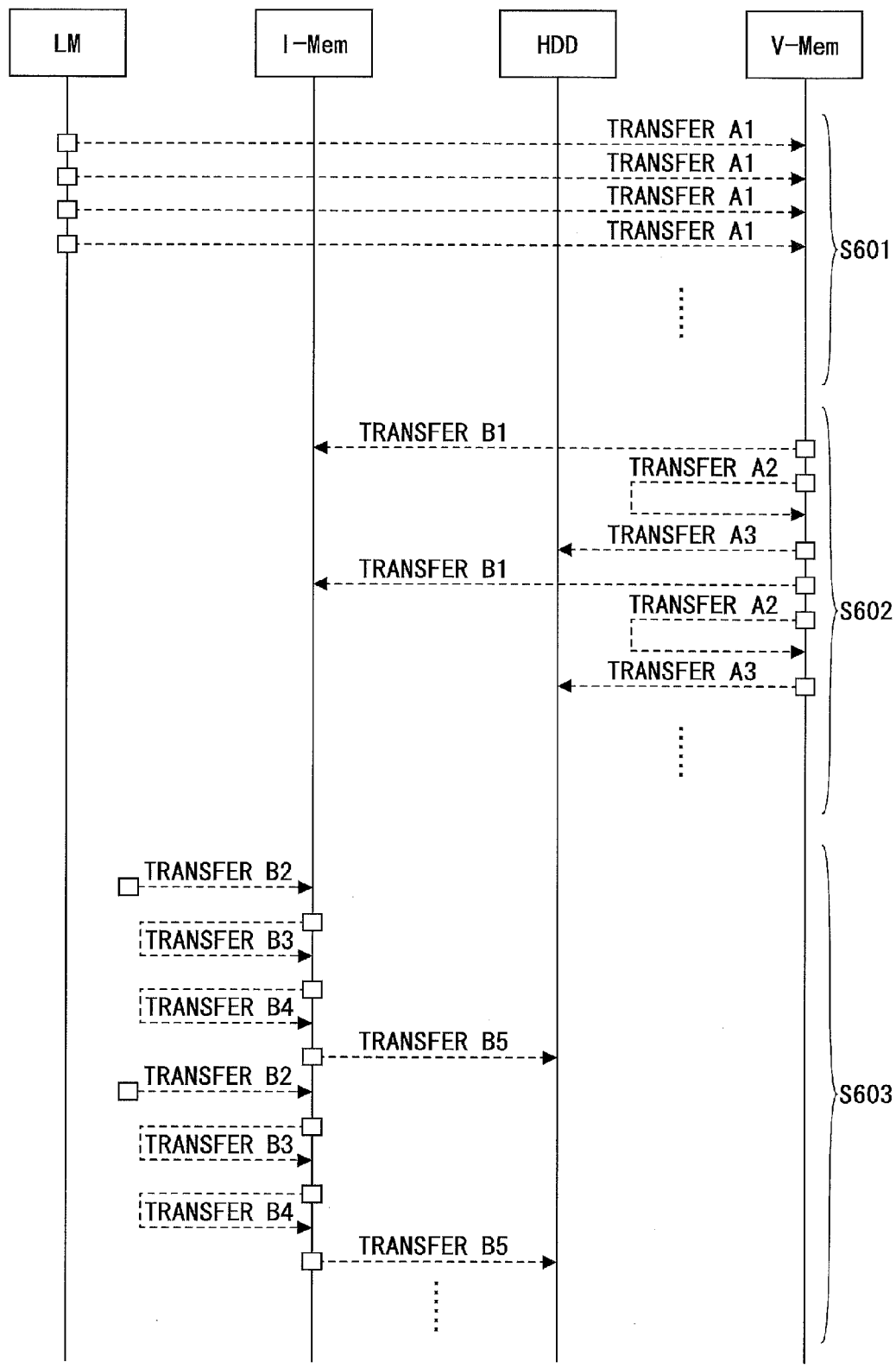
FIG. 6 is a sequence diagram illustrating an example of a procedure of data transfer among various types of memories by the data transfer arbitration processing in the case where data processing at an input unit in the controller ASIC provided in the image forming apparatus shown in FIG. 1 competes with data processing at an FDMAC.

FIG. 6 is a sequence diagram illustrating a procedure of data transfer among the various types of memories by the data transfer arbitration processing in the case where the data processing at the input unit 301 (data flow A1) in the controller ASIC 101 provided in the image forming apparatus according to the first embodiment competes with the data processing at the FDMAC 401 (data flow B1).

Referring to FIG. 6, when the data flow A1 (in FIG. 6, "data flow" is reworded as "transfer" and shown, as in the following) and the data flow B1 occur simultaneously in terms of a timing here, the FDMAC 401 grasps the status in the data transfer arbitration processing, and as shown in step S601, prioritizes the data flow A1 (transfer A1) and suppresses the data flow B1 (transfer B1) during that time. Therefore, the operation processing of the data flow A1 (transfer A1) is not inhibited.

Moreover, when the data flow A1 (transfer A1) ends, as shown in step S602, processing of a data flow B1 (transfer B1), processing of a data flow A2 (transfer A2), and processing of a data flow A3 (transfer A3) are performed serially. In this stage, since the respective data flows B1, A2 and A3 access the virtual memory (V-Mem) 108, competition in the access privileges for the virtual memory (V-Mem) 108 occurs. However, such a situation may be handled by data transfer arbitration processing in which arbitration in a round-robin system, which is a well-known art area, or the like is applied. For the data transfer according to the direct memory access control, it is determined whether to transfer and an order of the transfer based on a result of comparison of the preliminarily assigned priorities, and an optimum memory is determined and written to upon executing the direct memory access control.

Furthermore, when the data flow B1, the data flow A2, the data flow A3 (transfers B1, A2 and A3) end, as shown in step S603, a data flow B2 (transfer B2), a data flow B3 (transfer B3), a data flow B4 (transfer B4) and a data flow B5 (transfer B5) are performed serially. Here, considering the data transfer in a specific band (specific processing range), in the data flows B2 to B5, which are processed sequentially, competition in the access privilege for the image memory (I-Mem) 106 does not occur. On the other hand, when a parallel data transfer in plural bands is assumed, the data flows B2 to B5 compete with each other in the access privilege for the image memory (I-Mem) 106. Such a situation also may be handled by the data transfer arbitration processing, as described above, by applying the arbitration in the round-robin system, which is a well-known art area, or the like.

As described above, according to the first embodiment, in an image forming apparatus, upon performing data transfer for image data according to the direct memory access control among various types of memories connected to various types of devices, the FDMAC 401 (212), for data transfer in response to data transfer status between the image memory (I-Mem) 106 and the virtual memory (V-Mem) 108, determines whether to transfer and an order of the transfer based on a result of comparison for the preliminarily configured priorities, and performs data transfer arbitration processing, in which upon executing the direct memory access control, based on a data flow of data transfer, an optimum memory is determined and written to. According to the above, the data transfer can always be performed efficiently without decreasing the transfer band for data transfer with high priority.

Second Embodiment

Figure 7:
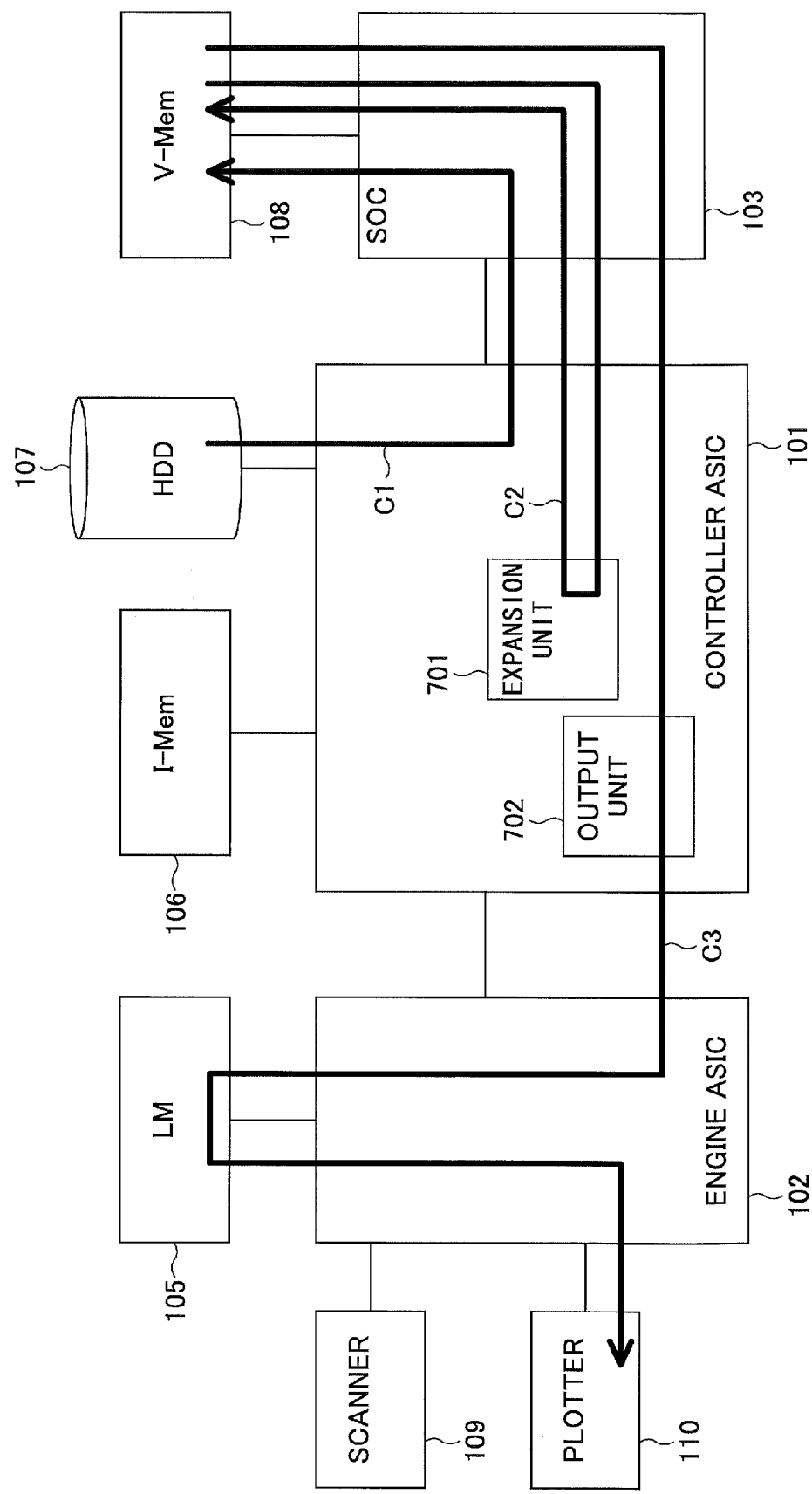
FIG. 7 is a functional block diagram illustrating an example of a flow of data processing which does not include data transfer arbitration processing upon outputting an image to a plotter connected to an engine ASIC provided in an image forming apparatus to be compared with a second embodiment of the present invention.

FIG. 7 is a functional block diagram illustrating a flow of data processing in the related art which does not include data transfer arbitration processing upon outputting an image to the plotter 110 connected to the engine ASIC 102 provided in an image forming apparatus to be compared with a second embodiment of the present invention.

Referring to FIG. 7, in the early stage of the flow of the data processing here, as shown by data flow C1, code data of drawing data stored in the hard disk drive (HDD) 107 are developed in the controller ASIC 101 and sent to the virtual memory (V-Mem) 108 via the processor SOC 103 and stored in the virtual memory (V-Mem) 108.

In the next stage, as shown by data flow C2, after the code data of drawing data once stored in the virtual memory (V-Mem) 108 are read by an expansion unit 701 installed in the controller ASIC 101 via the processor SOC 103, expansion processing is performed on the code data and the processed data are, as drawing image data, written back in the virtual memory (V-Mem) 108 via the processor 103.

Furthermore, in the successive stage, as shown by data flow C3, after the drawing image data once stored in the virtual memory (V-Mem) 108 are read by an output unit 702 installed in the controller ASIC 101 via the processor SOC 103, transferred to the local memory (LM) 105 via the engine ASIC 102 and stored in the local memory (LM) 105, the engine ASIC 102 reads the drawing image data from the local memory (LM) 105 and performs image output for them, as image data, to the plotter 110.

During the above-described flow of the data processing upon performing image output to the plotter 110, for the data flow C3, the data transfer is required to be performed in synchronization with the writing operation by the plotter 110. That is, in synchronization with a plotter operation at the plotter 110 for writing every one line, the transfer processing is required for image data output for each line to be performed within a time period for one line.

However, for the data flow C3, although drawing image data related to image data to be output are required to be read out from the virtual memory (V-Mem) 108 and transmitted through the PCIe CPU I/F 113, for the PCIe CPU I/F 113, competition on the PCIe CPU I/F 113 is likely to occur, such as data transfer for data other than drawing image data, a register access from the processor SOC 103 to the controller ASIC 101 or PIO processing from the processor SOC 103 to image memory 106 (I-Mem) 106, and there is a possibility of occurrence of an under run error since data transfer performance of the data flow C3 is not satisfied. Accordingly, according to the functional block diagram shown in FIG. 7, since the data transfer arbitration processing is not performed, in which for the data transfer according to the direct memory access control it is determined whether to transfer and an order of the transfer based on a result of comparison for the preliminarily configure priorities, upon executing the direct memory access control based on a data flow of data transfer, an optimum memory is determined and written to, the occurrence of the under run error cannot be prevented.

Figure 8:
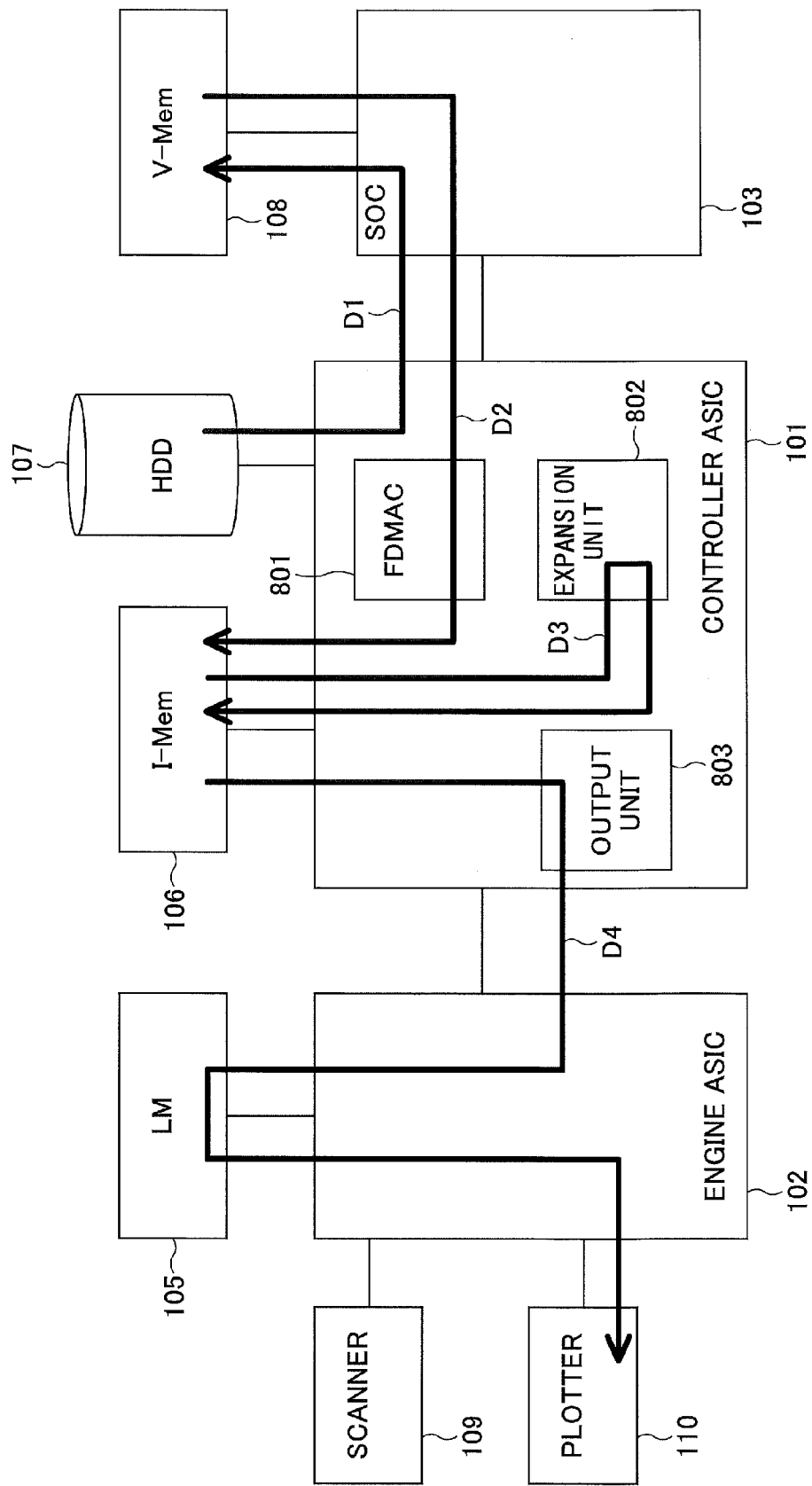
FIG. 8 is a functional block diagram illustrating an example of a flow of data processing including data transfer arbitration processing upon outputting an image to a plotter connected to an engine ASIC provided in an image forming apparatus according to the second embodiment.

FIG. 8 is a functional block diagram illustrating a flow of data processing including data transfer arbitration processing upon performing image data output to the plotter 110 connected to the engine ASIC 102 provided in the image forming apparatus according to the second embodiment.

Referring to FIG. 8, in an early stage of the flow of data processing here, as shown by data flow D1, code data of drawing data once stored in the hard disk drive (HDD) 107 are developed and transferred from the controller ASIC 101 to the virtual memory (V-Mem) 108 via the processor SOC 103, and stored in the virtual memory (V-Mem) 108.

In the next stage, as shown by data flow D2, the code data of drawing data once stored in the virtual memory (V-Mem) 108 are read in data transfer arbitration processing by an FDMAC 801 installed in the controller ASIC 101 via the processor SOC 103. The FDMAC 801 transfers the code data of drawing data to the image memory (I-Mem) 106 and stores the code data in the image memory (I-Mem) 106.

Furthermore, in the successive stage, as shown by data flow D3, after the code data of drawing data once stored in the image memory (I-Mem) 106 are read by an expansion unit 802 installed in the controller ASIC 101, expansion processing is performed on the code data and the processed data are, as drawing image data, written back to the image memory (I-Mem) 106.

Subsequently, in the successive stage, as shown by data flow D4, after the drawing image data once stored in the image memory (I-Mem) 106 are read by an output unit 803 installed in the controller ASIC 101, transferred to the local memory (LM) 105 via the engine ASIC 102 and stored in the local memory (LM) 105, the engine ASIC 102 reads out the drawing image data from the local memory (LM) 105 and performs image output for them, as image data, to the plotter 110.

In this way, in the second embodiment shown in FIG. 8, as data processing including data transfer arbitration processing upon performing image output, code data of drawing data are preliminarily transferred from the virtual memory (V-Mem) 108 to the image memory (I-Mem) 106 in the data transfer arbitration processing by using the FDMAC 801. Afterwards, expansion processing and the output processing are performed. The data flow D4 here, in the same way as the data flow C3, although the data transfer is required to be performed, in synchronization with a plotter operation at the plotter 110 for writing every one line, for image data output for each line within a time period for one line, after the drawing image data related to the image data to be output are read from the virtual memory (V-Mem) 108, they are not required to pass through the PCIe CPU I/F 113 and the competition does not occur, so there is not a possibility of occurrence of an under run error due to the data transfer performance being unsatisfied, as in the case of the data flow C3 explained with reference to FIG. 7.

Moreover, since the data flow D1 here, in the same way as the data flow C1, defines a procedure that code data of drawing data, which are first stored in the hard disk drive (HD) 107, are developed and sent to the virtual memory (V-Mem) 108, it is possible to realize the procedure without changing software that controls it.

Third Embodiment

Figure 9:
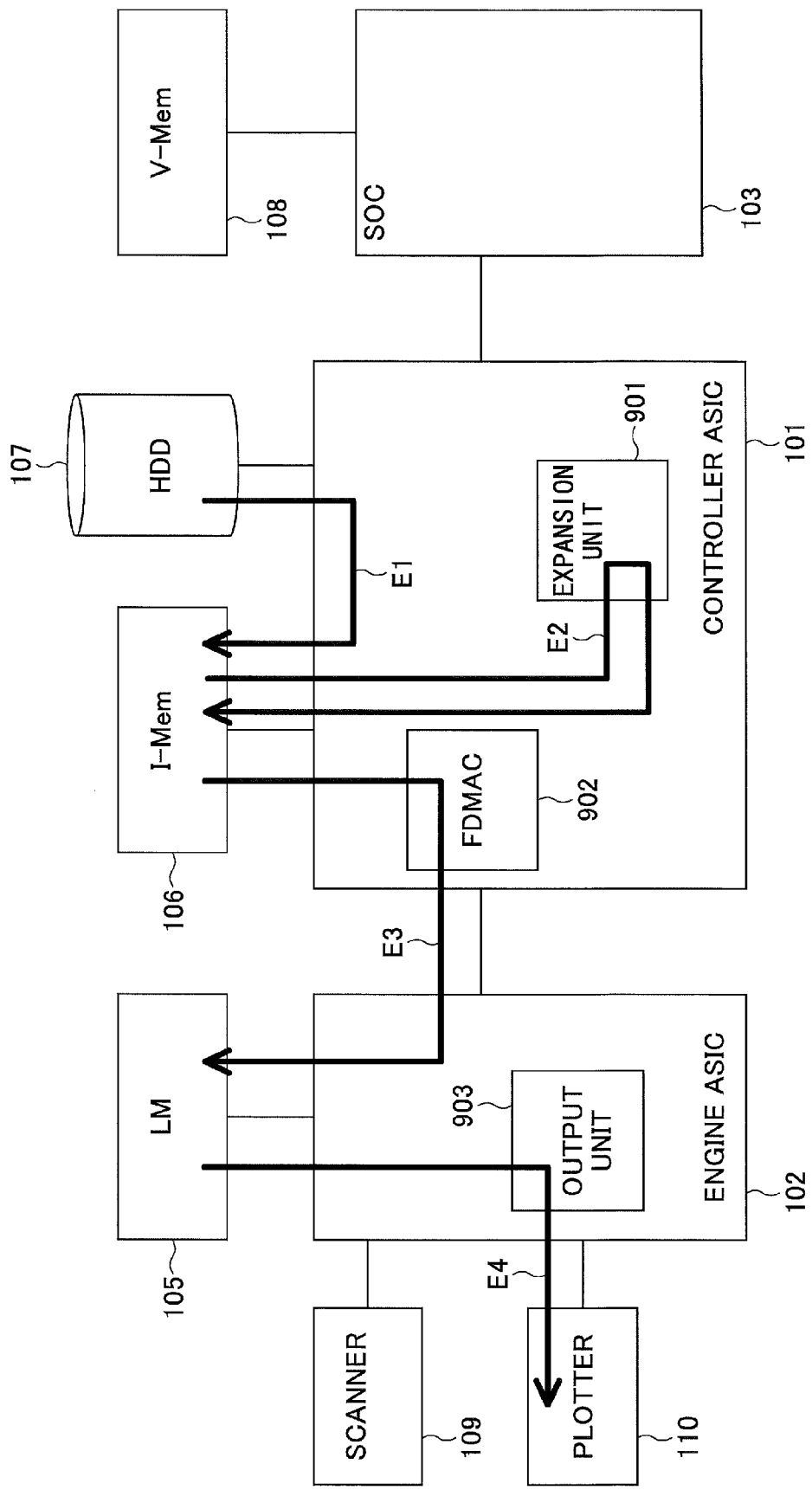
FIG. 9 is a functional block diagram illustrating an example of a flow of data processing including data transfer arbitration processing upon outputting an image to a plotter connected to an engine ASIC provided in an image forming apparatus according to a third embodiment.

FIG. 9 is a functional block diagram illustrating a flow of data processing including data transfer arbitration processing upon performing image output to the plotter 110 connected to an engine ASIC 102 provided in an image forming apparatus according to a third embodiment.

Referring to FIG. 9, in the early stage of the flow of data processing upon performing image output, as shown by data flow E1, code data of drawing data stored in the hard disk drive (HDD) 107 are read out by the controller ASIC 101, developed and sent to the image memory (I-Mem) 106 and stored in the image memory (I-Mem) 106.

In the next stage, as shown by data flow E2, after the code data of drawing data once stored in the image memory (I-Mem) 106 are read out by an expansion unit 901 installed in the controller ASIC 101, expansion processing is performed on the code data, and the processed data are, as drawing image data, written back to the image memory (I-Mem) 106.

Furthermore, in the successive stage, as shown by data flow E3, the drawing image data once stored in the image memory (I-Mem) 106 are read out in data transfer arbitration processing by an FDMAC 902 installed in the controller ASIC 101, and transferred to the engine ASIC 102. Then, the engine ASIC 102 stores the drawing image data in the local memory (LM) 105.

Subsequently, in the successive stage, as shown by data flow E4, after the drawing image data once stored in the local memory (LM) 105 are read out by an output unit 903 installed in the engine ASIC 102, image data output is performed for the drawing image data to the plotter 110.

In the third embodiment, since the code data of drawing data stored in the hard disk drive (HDD) 107 are developed and sent to the image memory (I-Mem) 106 in the first data flow E1, it is necessary to change software for controlling it. However, since it is not necessary to use resources of the virtual memory (V-Mem) 108 and the PCIe CPU I/F 113, transfer performance is superior taking account of competition with other processing execution.

Moreover, although capacity of the local memory (LM) 105 connected as a subordinate of control of the engine ASIC 102 can be considered to be insufficient, in such a case, depending on the usable capacity of the local memory (LM) 105, the FDMAC 903 may adjust data amount to be transferred in the data transfer arbitration processing in the data flow E3. According to the above, drawing image data can be output effectively, as image data, from the local memory (LM) 105 to the plotter 110.

The data transfer arbitration processing function of the FDMAC 212, 401, 801 or 902 as the data transfer control unit in the image forming apparatus according to the respective above-described embodiments (first embodiment to third embodiment), can be reworded as a data transfer control method for image formation processing in the case where data transfer for image data is performed according to the direct memory access control from an arbitrary memory to another memory in various types of memories connected to various types of devices by the data transfer control unit in the image forming apparatus. In each of the above-described embodiments, the method corresponds to performing data transfer for image data according to the direct memory access control from an arbitrary memory to another memory, where the arbitrary memory includes the local memory (LM) 105 as a first memory connected as a subordinate of control to the engine ASIC 102 as a first device, the image memory (I-Mem) 106 as a second memory connected as a subordinate of control to the controller ASIC 101 as a second device and the virtual memory (V-Mem) 108 as a third memory connected as a subordinate of control to the processor SOC 103 as a third device. The characteristic of the data transfer control method for image formation processing in the above case is to include the data transfer arbitration processing step, by the data transfer control unit (FDMAC 212, 401, 801 or 902) provided in the controller ASIC 101, for the data transfer according to the direct memory access control which is performed by cooperating with the engine ASIC 102 receiving instruction control from the processor SOC 103, for determining whether to transfer and an order of the transfer, based on a result of comparison for the preliminarily configured priorities, and for determining an optimum memory upon executing the direct memory access control based on a data flow of data transfer and writing.

However, in the data transfer arbitration processing step here, data transfer according to the direct memory access control in response to a status of data transfer between the image memory (I-Mem) 106 and the virtual memory (V-Mem) 108 is preferably performed as the data transfer arbitration processing. Or, data transfer according to the direct memory access control based on the usable capacity of the local memory (LM) 105 is preferably performed as the data transfer arbitration processing. In any case, a data transfer control program for image formation processing that causes a computer to execute the above-described data transfer arbitration processing step of the data transfer control method for image formation processing is software.

Fourth Embodiment

Figure 10:
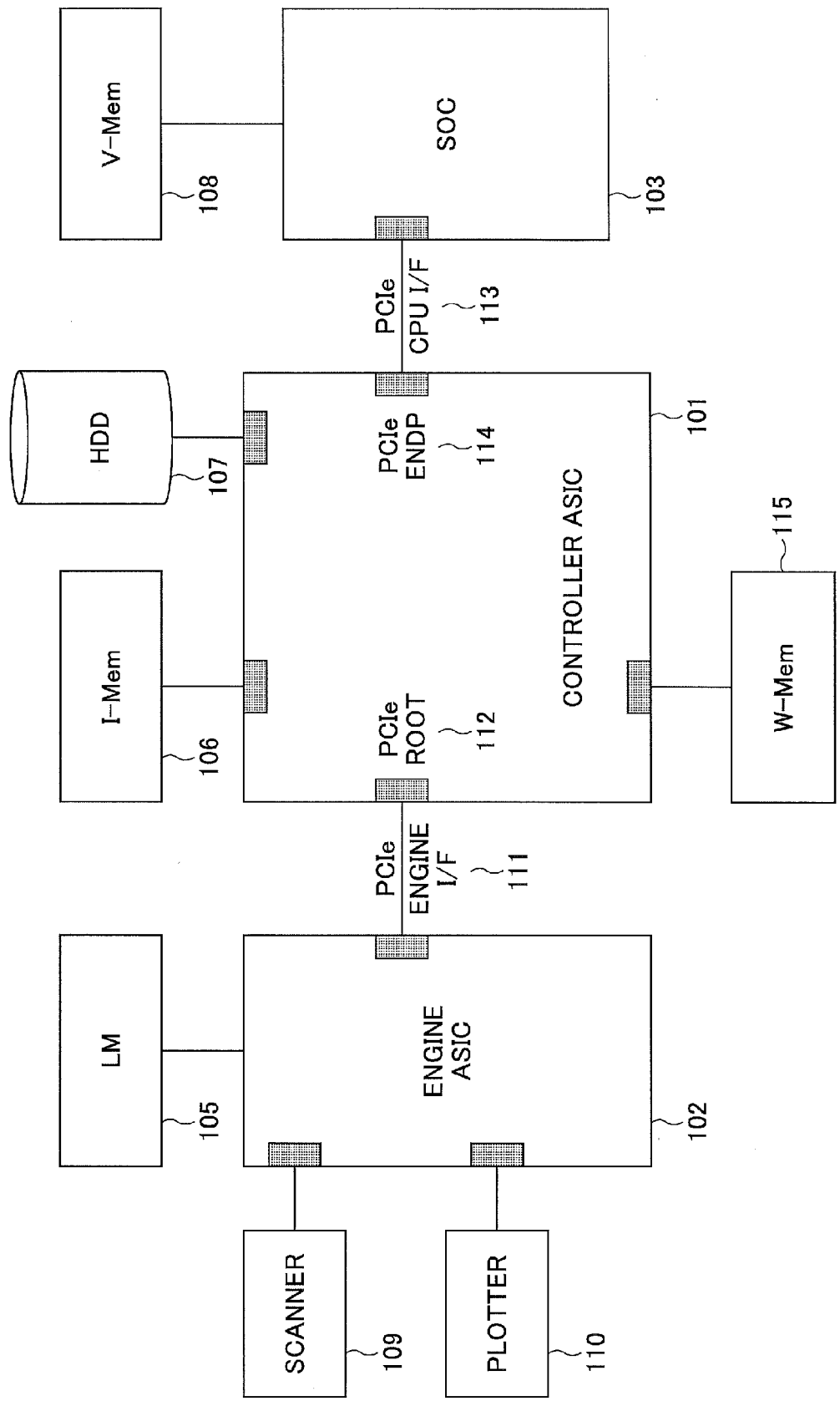
FIG. 10 is a block diagram illustrating an example of a basic configuration of an image forming apparatus according to a fourth embodiment.

FIG. 10 is a block diagram illustrating a basic configuration of an image forming apparatus according to a fourth embodiment. The image forming apparatus is different from the configuration of the apparatus according to the first embodiment shown in FIG. 1 in the following points. That is, other than the image memory (I-Mem) 106 as the second memory connected as a subordinate of control to the controller ASIC 101 as the second device, a work memory (W-Mem) 115 as a third memory is connected as a subordinate of control; the virtual memory (V-Mem) 108 connected as a subordinate of control to the processor SOC 103 as the third device is used as a fourth memory; and the data transfer control unit has a function of data transfer for image data according to the direct memory access control from an arbitrary memory out of the local memory (LM) 105, the image memory (I-Mem) 106, the work memory (W-Mem) 115 and the virtual memory (V-Mem) 108 to another memory. Moreover, other configuration details are the same as those in the first embodiment.

Among the above memories, an example of the work memory (W-Mem) 115 configured with a DDR3 SDRAM will be illustrated. Moreover, the function of the FDMAC 212 of the controller ASIC 101 mainly bears also the data transfer control unit that performs the data transfer arbitration processing here. In the present embodiment, the data transfer control unit is provided with, for data transfer according to the direct memory access control, the function of determining whether to transfer and an order of the transfer based on a result of comparison for the preliminarily configured priorities, and of determining an optimum memory upon executing the direct memory access control based on a data flow of data transfer. Moreover, other configuration details are common, and explanations will be omitted.

Figure 11:
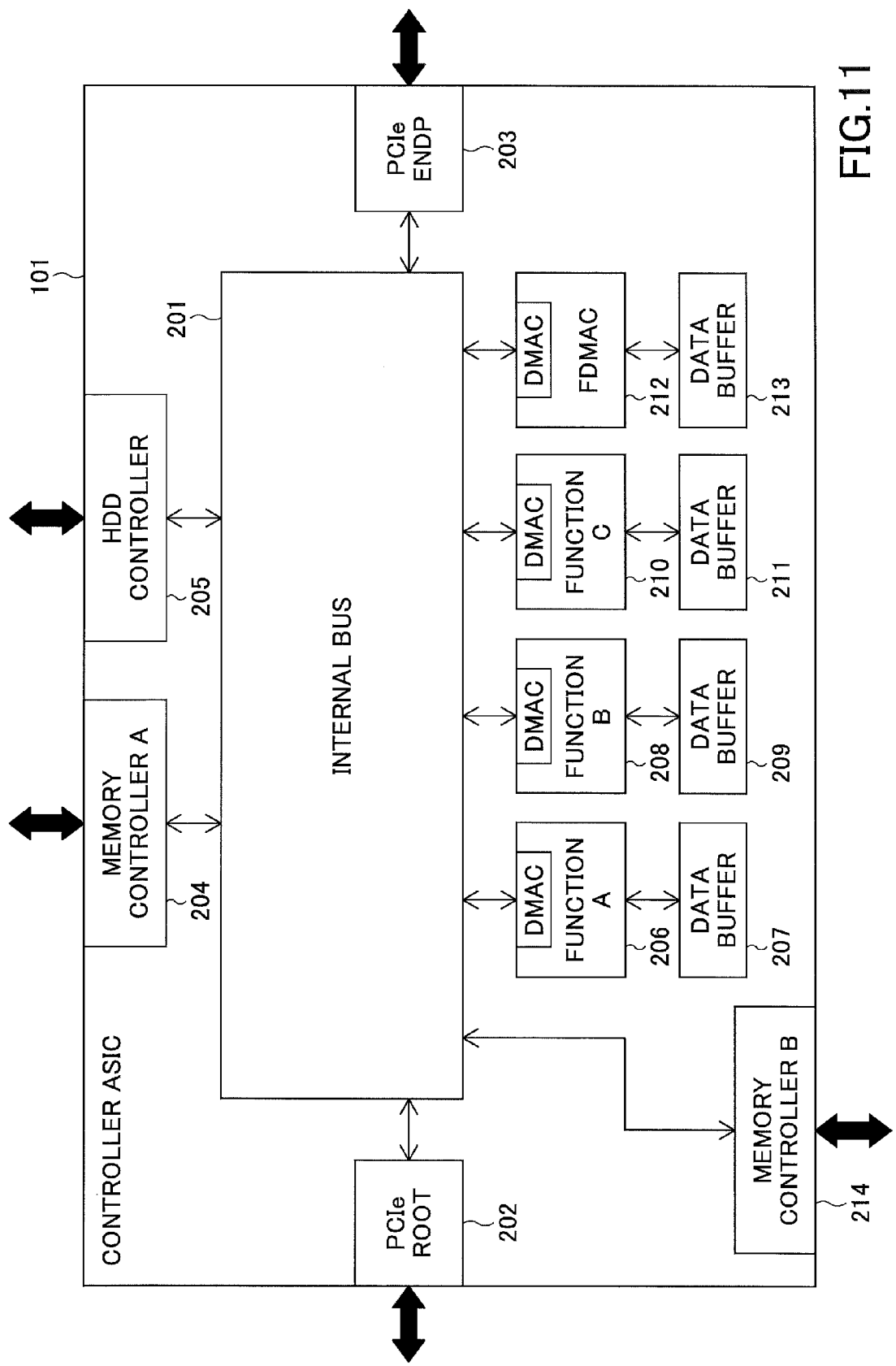
FIG. 11 is a block diagram illustrating an example of a detailed configuration of a controller ASIC provided in the image forming apparatus shown in FIG. 10.

FIG. 11 is a block diagram illustrating a detailed configuration of a controller ASIC 101 provided in the image forming apparatus according to the fourth embodiment. The controller ASIC 101 is different from the configuration of the control ASIC according to the first embodiment shown in FIG. 2 in the following points. That is, other than the memory controller A 204 to be connected to the image memory (I-Mem) 106 being connected to the internal bus 201 (the same configuration as the memory controller 204 in FIG. 2), a memory controller B 214 to be connected to the work memory (W-Mem) 115 is connected to the internal bus 201, and the memory controller B 214 is provided with a function of controlling an interface upon performing data transfer to the work memory (W-Mem) 115. Moreover, other configuration details are the same as those in the first embodiment, and explanations will be omitted.

The data transfer among various types of memories here includes, for example, a case of performing data transfer from the virtual memory (V-Mem) 108 to the image memory (I-Mem) 106, a case of performing data transfer from the virtual memory (V-Mem) 108 to the work memory (W-Mem) 115, a case of performing data transfer from the virtual memory (V-Mem) 108 to the local memory (LM) 105, a case of performing data transfer from the image memory (I-Mem) 106 to the local memory (LM) 105, a case of performing data transfer from the image memory (I-Mem) 106 to the work memory (W-Mem) 115, a case of performing data transfer from the work memory (W-Mem) 115 to the local memory (LM) 105, and their opposite patterns, i.e. a case of performing data transfer from the image memory (I-Mem) 106 to the virtual memory (V-Mem) 108, a case of performing data transfer from the work memory (W-Mem) 115 to the virtual memory (V-Mem) 108, a case of performing data transfer from the local memory (LM) 105 to the virtual memory (V-Mem) 108, a case of performing data transfer from the local memory (LM) 105 to the image memory (I-Mem) 106, a case of performing data transfer from the work memory (W-Mem) 115 to the image memory (I-Mem) 106 or a case of performing data transfer from the local memory (LM) 105 to the work memory (W-Mem) 115. Furthermore, a memory as a transmission source may be the same as a memory as a transmission destination. Specifically, the data transfer includes a case of performing data transfer from some region in the virtual memory (V-Mem) 108 to another region in the virtual memory (V-Mem) 108, a case of performing data transfer from some region in the image memory (I-Mem) 106 to another region in the image memory (I-Mem) 106, a case of performing data transfer from some region in the work memory (W-Mem) 115 to another region in the work memory (W-Mem) 115 or a case of performing data transfer from some region in the local memory (LM) 105 to another region in the local memory (LM) 105. An order of processing is assigned to each of the data transfers.

Figure 12:
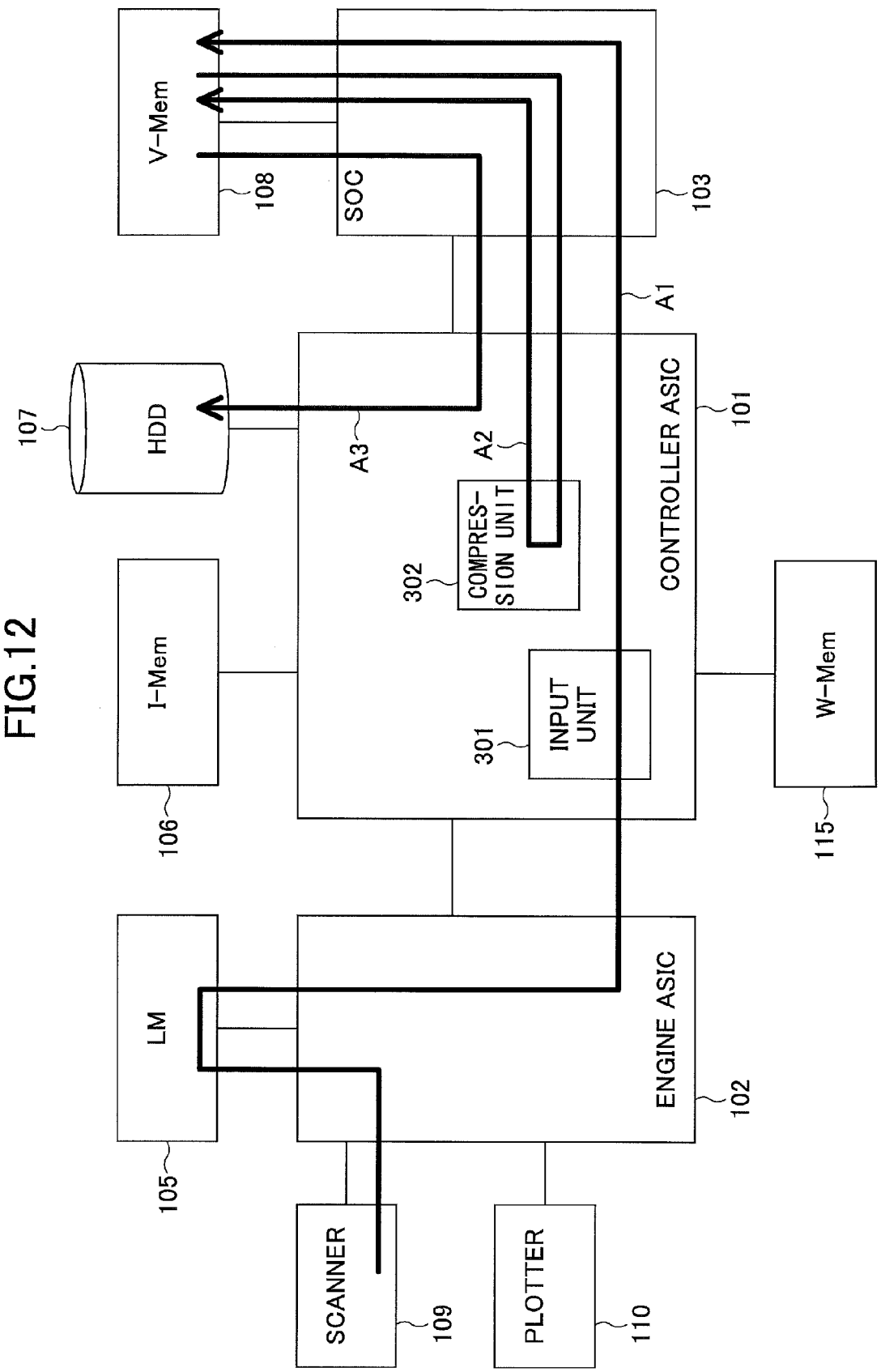
FIG. 12 is a functional block diagram illustrating an example of a flow of data processing, when an image is input from a scanner connected to an engine ASIC provided in the image forming apparatus shown in FIG. 10.
Figure 13:
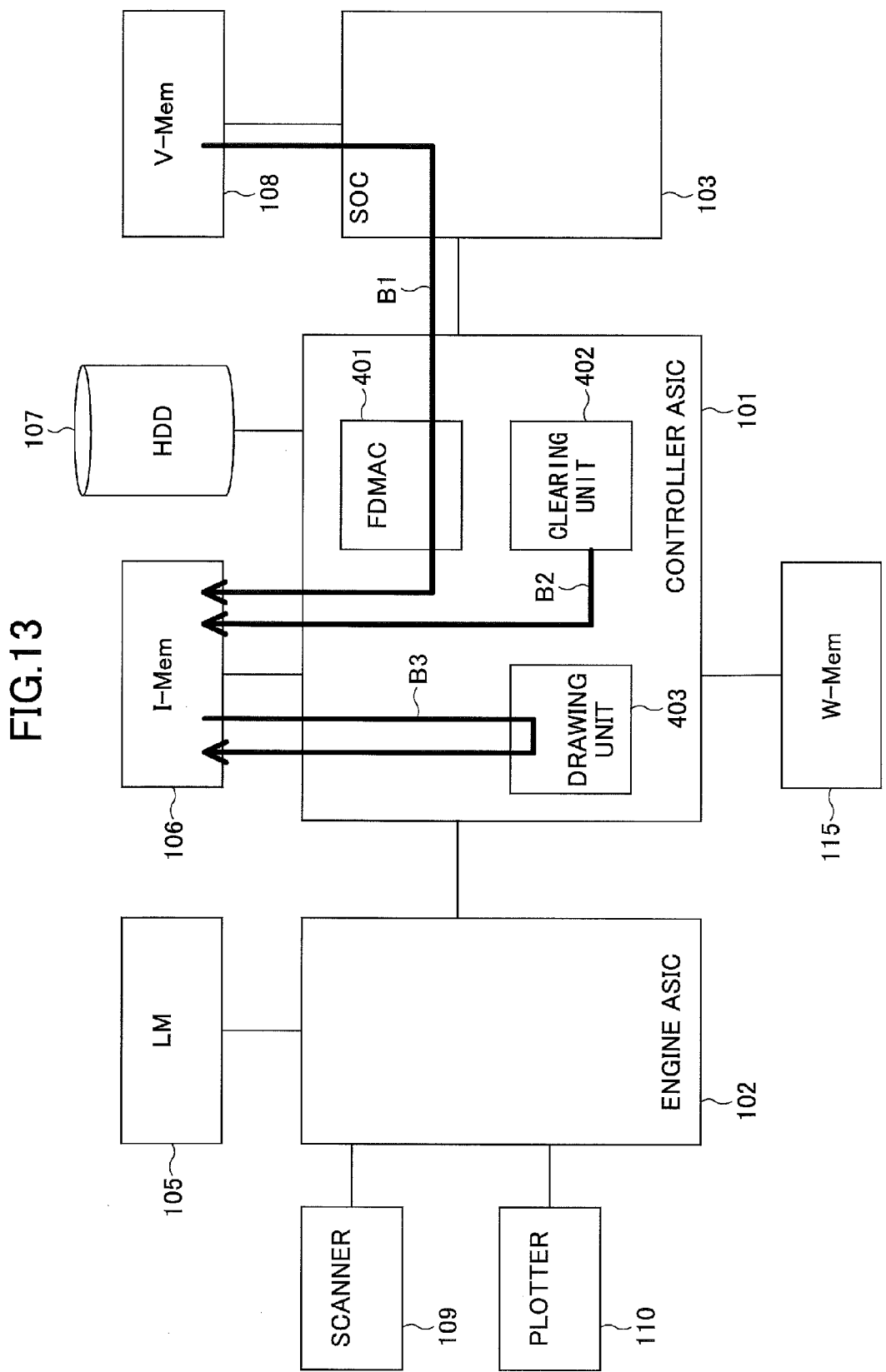
FIG. 13 is a functional block diagram illustrating an example of a flow of data processing of a first half of a printer drawing including data transfer arbitration processing at the controller ASIC provided in the image forming apparatus shown in FIG. 10.

FIG. 12 is a functional block diagram illustrating a flow of data processing, when an image is input from the scanner 109 connected to an engine ASIC 102 provided in the image forming apparatus according to the fourth embodiment. The flow of data processing here, despite a difference of configuration of the controller ASIC 101, to which the work memory (W-Mem) 115 is connected, has the same processing content as in the case of the first embodiment shown in FIG. 3, since it does not participate in the work memory (W-Mem) 115, and explanations will be omitted. Moreover, FIG. 13 is a functional block diagram illustrating a flow of data processing of a first half of a printer drawing including data transfer arbitration processing at the controller ASIC 101 provided in the image forming apparatus according to the fourth embodiment. Similarly, the flow of data processing of the first half of the printer drawing, despite the difference of configuration of the controller ASIC 101, to which the work memory (W-Mem) 115 is connected, also has the same processing content as in the case of the first embodiment shown in FIG. 4, since it does not participate in the work memory (W-Mem) 115, and explanations will be omitted.

Figure 14:
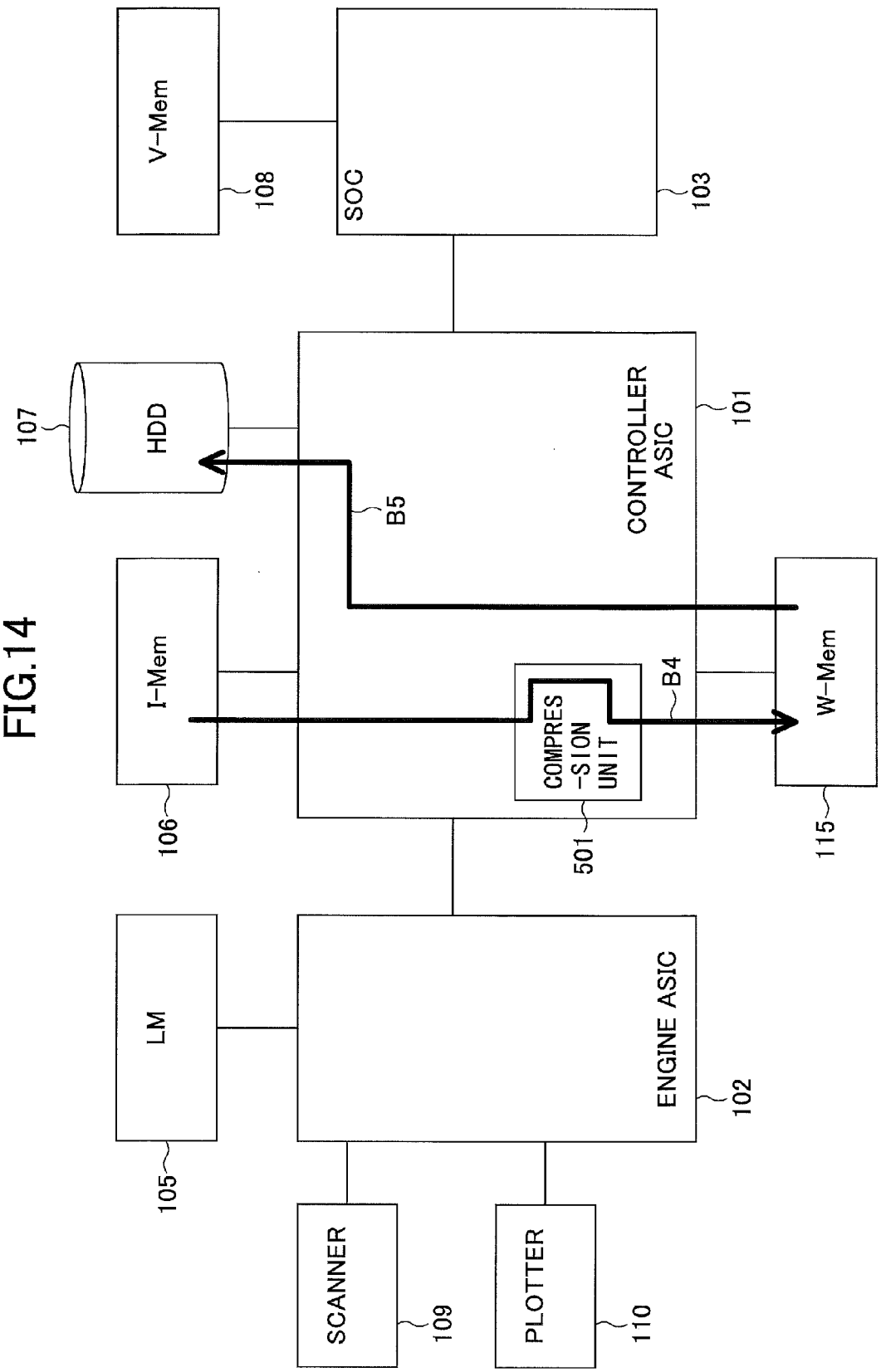
FIG. 14 is a functional block diagram illustrating an example of a flow of data processing of a second half of the printer drawing at the controller ASIC provided in the image forming apparatus shown in FIG. 10.

FIG. 14 is a functional block diagram illustrating a flow of data processing of a second half of the printer drawing at the controller ASIC 101 provided in the image forming apparatus according to the fourth embodiment.

Referring to FIG. 14, in the early stage of the flow of data processing here, as shown by data flow B4, drawing data drawn in the drawing data developing area in the image memory (I-Mem) 106 are read out by the compression unit 501 installed in the controller ASIC 101, compression processing is performed on the drawing data, and the processed data are written in the work memory (W-Mem) 115 as code data.

In the next stage, as shown by data flow B5, the controller ASIC 101 transfers the code data once stored in the work memory (W-Mem) 115 to the hard disk drive (HDD) 107 and stores the code data in the hard disk drive (HDD) 107. Also in this stage, the FDMAC 401 grasps the status of competition in the data transfer arbitration processing, and by shifting the timing of execution of the data flow B1 in FIG. 13 the operation processing of the data flow A1 in FIG. 12 is controlled so as not to be inhibited, and the occurrence of the data overrun error is prevented. The above feature is in common with the first embodiment.

Furthermore, any flow of the data flow B1, the data flow B2 and the data flow B3 is a data transfer flow using the image memory (I-Mem) 106. The data flow B4 is a flow of writing code data, which is obtained by performing compression processing for the drawing data read out from the image memory (I-Mem) 106, into the work memory (W-Mem) 115. The data flow B5 is a flow of transferring the code data once stored in the work memory (W-Mem) 115 to the hard disk drive (HDD) 107. In this way, by using the image memory (I-Mem) 106 and the work memory (W-Mem) 115 separately depending on the data flow, accesses to the image memory (I-Mem) 106 can be decentralized, thereby a decrease in data transfer performance is prevented. In any case, a data transfer flow using the image memory (I-Mem) 106 or a data transfer flow using the work memory (W-Mem) 115 is preferably decentralized so that each memory is accessed effectively based on a transfer amount of data or a required transfer rate.

Figure 15:
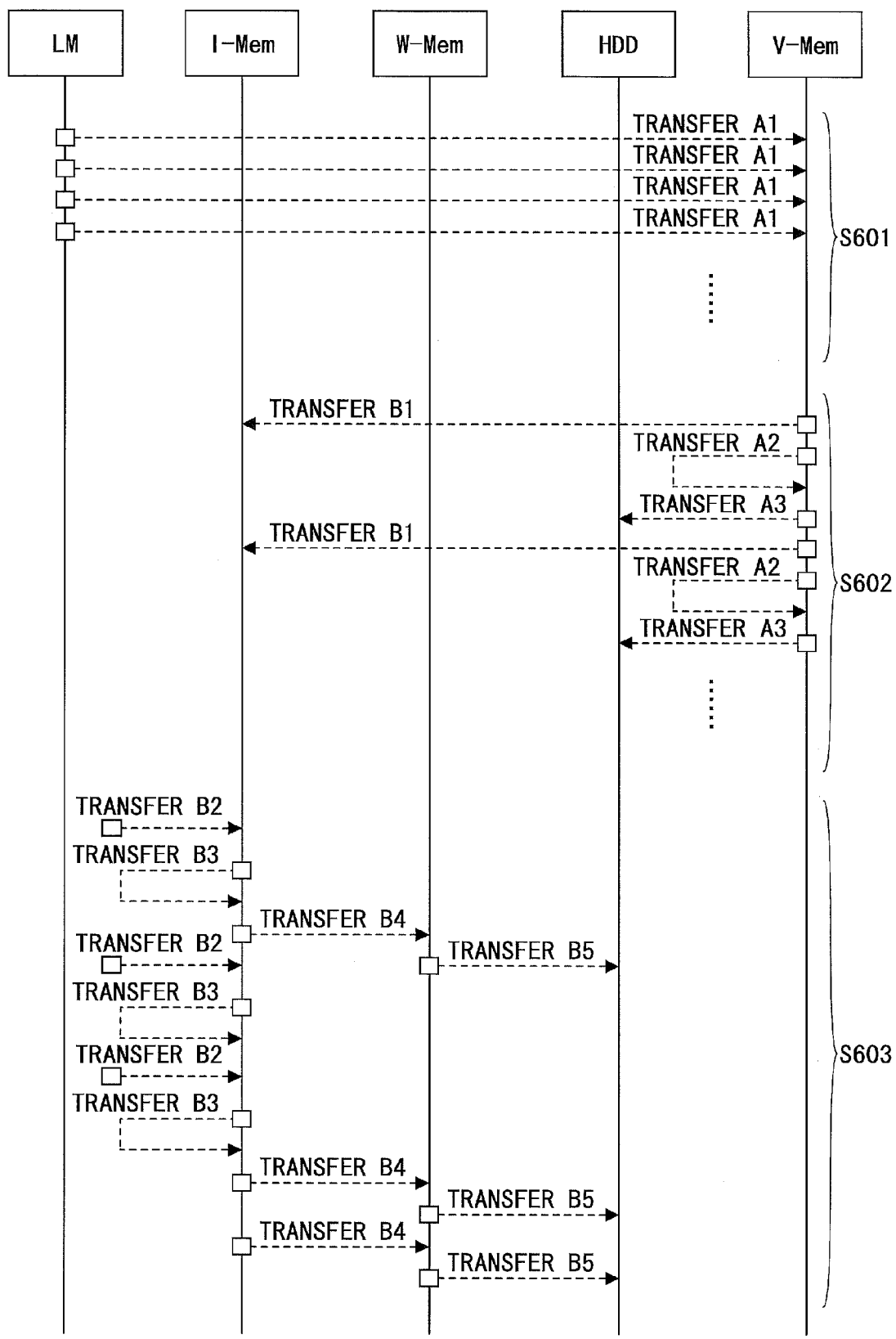
FIG. 15 is a sequence diagram illustrating an example of a procedure of data transfer among various types of memories by the data transfer arbitration processing in the case where data processing at an input unit in the controller ASIC provided in the image forming apparatus shown in FIG. 10 competes with data processing at an FDMAC.

FIG. 15 is a sequence diagram illustrating a procedure of data transfer among various types of memories by the data transfer arbitration processing in the case where data processing (data flow A1) at the input unit 301 in the controller ASIC 101 provided in the image forming apparatus according to the fourth embodiment competes with data processing (data flow B1) at the FDMAC 401.

Referring to FIG. 15, when the data flow A1 (in FIG. 15, "data flow" is reworded as "transfer" and shown, as in the following) and the data flow B1 occur simultaneously in terms of a timing also here, in the same way as in the case of the first embodiment explained with reference to FIG. 6, the FDMAC 501 grasps the status in the data transfer arbitration processing, and as shown in step S601, prioritizes the data flow A1 (transfer A1) and suppresses the data flow B1 (transfer B1) during that time. Therefore, the operation processing of the data flow A1 (transfer A1) is not inhibited.

Moreover, when the data flow A1 (transfer A1) ends, as shown in step S602, processing of the data flow B1 (transfer B1), processing of a data flow A2 (transfer A2), and processing of a data flow A3 (transfer A3) are performed serially. In this stage, since the respective data flows B1, A2 and A3 access the virtual memory (V-Mem) 108, competition in the access privileges for the virtual memory (V-Mem) 108 occurs. However, such a situation may be handled, in the same way as in the case of the first embodiment explained with reference to FIG. 6, by data transfer arbitration processing in which arbitration in the round-robin system, which is a well-known art area, or the like is applied; for the data transfer according to the direct memory access control, it is determined whether to transfer and an order of the transfer based on a result of comparison for the preliminarily configured priorities, and an optimum memory is determined and written to, based on a data flow of data transfer, upon executing the direct memory access control.

Furthermore, when the data flow B1, the data flow A2, the data flow A3 (transfers B1, A2 and A3) end, as shown in step S603, a data flow B2 (transfer B2), a data flow B3 (transfer B3), a data flow B4 (transfer B4) and a data flow B5 (transfer B5) are performed serially. Here, considering the data transfer in plural bands, competition in the access privilege for the image memory (I-Mem) 106 occurs. However, since the processing of writing in the data flow B4 and the processing of storing in the data flow B5 are performed by using the work memory (W-Mem) 115, which is physically different from the image memory (I-Mem) 106, the competition in the access privilege for the image memory (I-Mem) 106 is decentralized, and data transfer with higher transfer efficiency can be executed. Also here, the competition in the access privilege for the image memory (I-Mem) 106 or the work memory (W-Mem) 115 may be handled by the data transfer arbitration processing, as described above, by applying the arbitration in the round-robin system, which is a well-known art area, or the like. In any case, the data transfer flow using the image memory (I-Mem) 106 and the data transfer flow using the work memory (W-Mem) 115 are preferably decentralized so that each memory is accessed efficiently, in the same way as in the above-described case.

As described above, according to the fourth embodiment, in an image forming apparatus, upon performing data transfer for image data according to the direct memory access control among various types of memories connected to various type of devices, the FDMAC 401 (212), for data transfer in response to data transfer status between the image memory (I-Mem) 106 and the virtual memory (V-Mem) 108, determines whether to transfer and an order of the transfer based on a result of comparison for the preliminarily configured priorities, and performs data transfer arbitration processing. Upon executing the direct memory access control, based on a data flow of data transfer, an optimum memory is determined and written to. According to the above, the data transfer can be always performed efficiently without decreasing the transfer band for data transfer with high priority. Furthermore, since the optimum memory is determined upon executing the direct memory access control, based on the data flow of data transfer, competition in access privilege for a memory used for data transfer is decentralized, and data transfer can be always performed efficiently.

Fifth Embodiment

Figure 16:
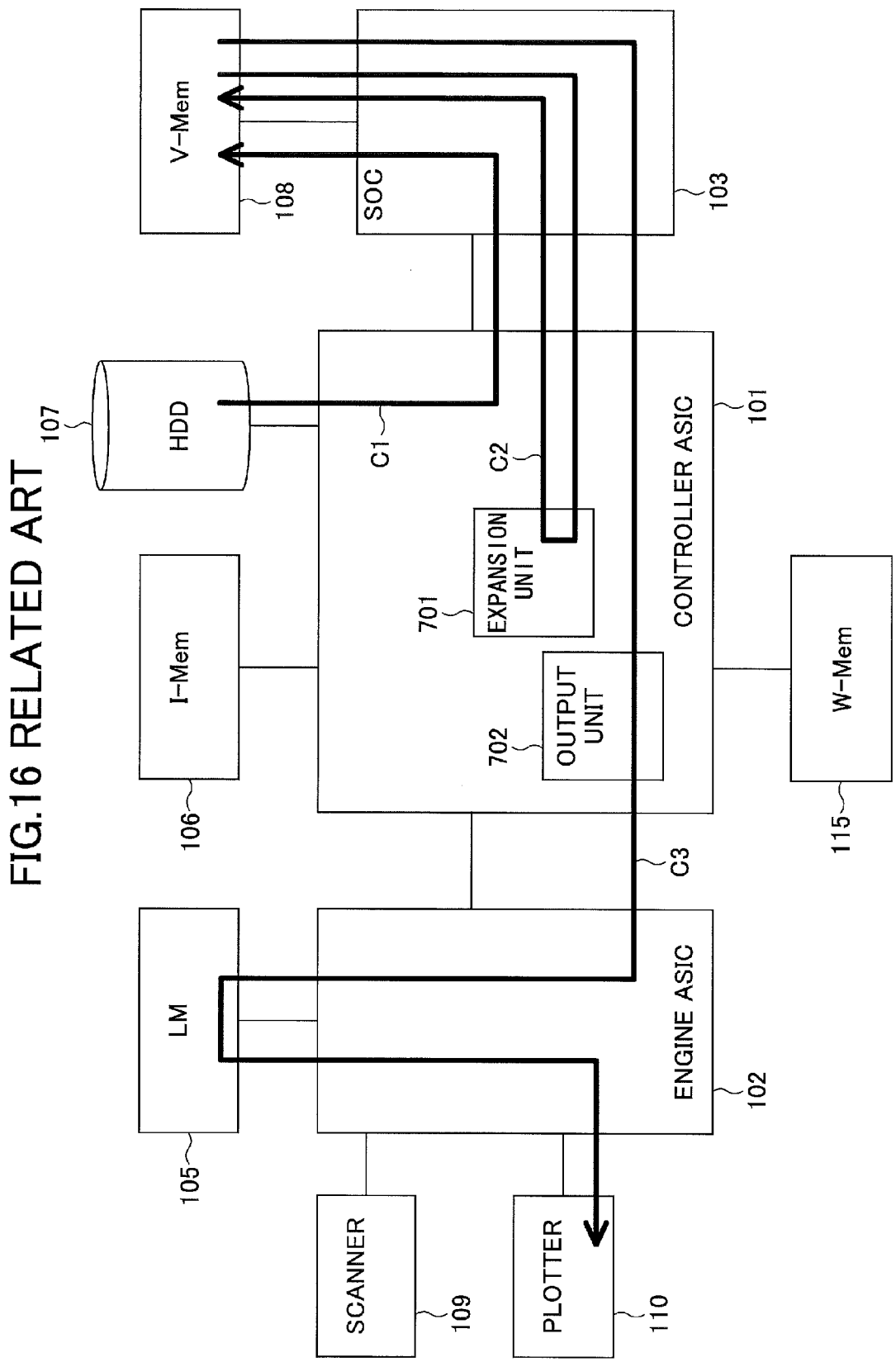
FIG. 16 is a functional block diagram illustrating an example of a flow of data processing which does not include data transfer arbitration processing upon outputting an image to a plotter connected to an engine ASIC provided in an image forming apparatus to be compared with a fifth embodiment of the present invention.

FIG. 16 is a functional block diagram illustrating a flow of data processing which does not include data transfer arbitration processing upon outputting an image to a plotter connected to an engine ASIC provided in an image forming apparatus to be compared with a fifth embodiment of the present invention. The flow of data processing here, despite a difference of configuration of the controller ASIC 101, to which the work memory (W-Mem) 115 is connected, has the same processing content as in the case of the second embodiment shown in FIG. 7, since it does not participate in the work memory (W-Mem) 115, and explanations will be omitted.

Figure 17:
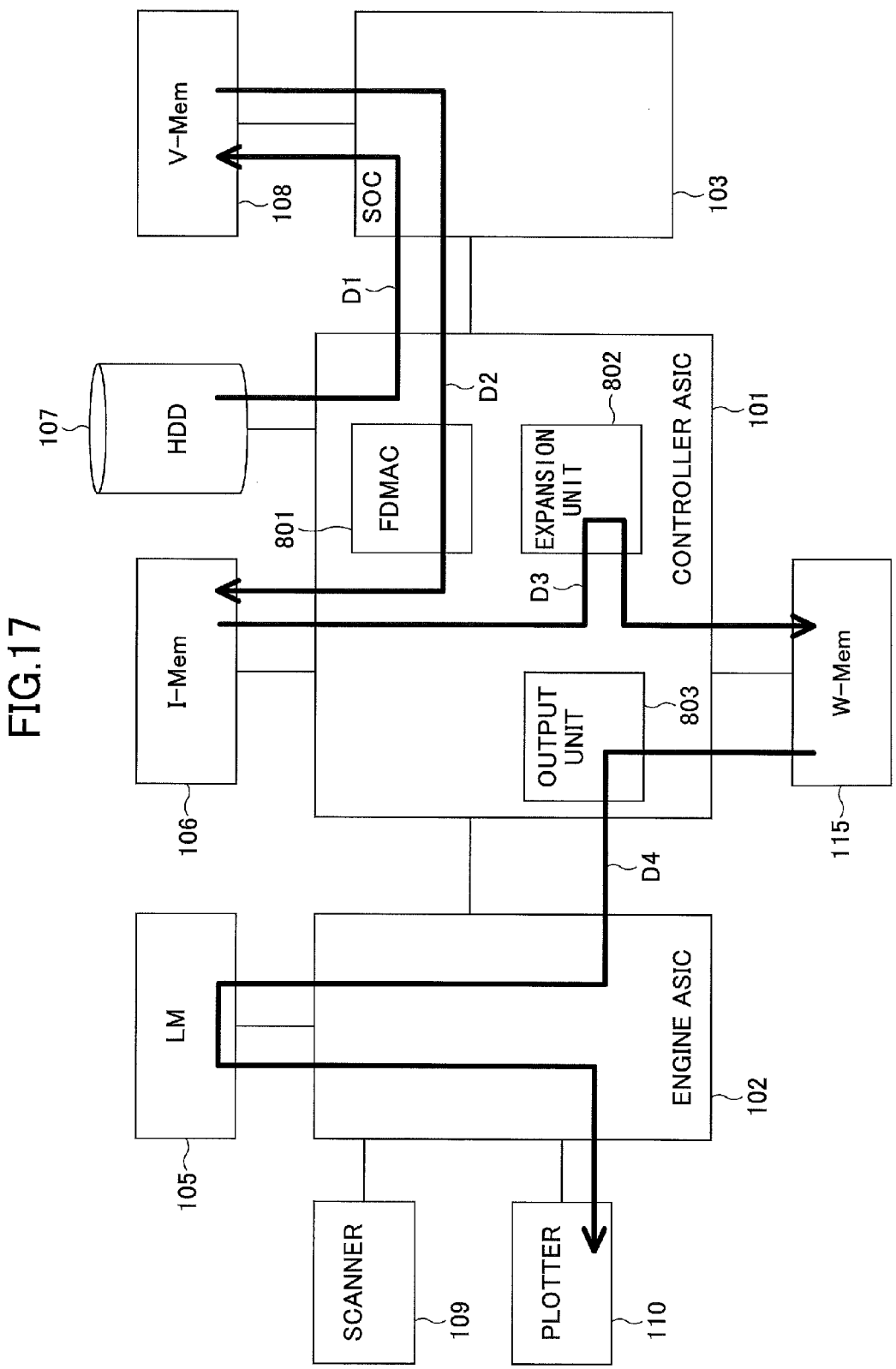
FIG. 17 is a functional block diagram illustrating an example of a flow of data processing including data transfer arbitration processing upon outputting an image to a plotter connected to an engine ASIC provided in an image forming apparatus according to the fifth embodiment.

FIG. 17 is a functional block diagram illustrating a flow of data processing including data transfer arbitration processing upon outputting an image to a plotter connected to an engine ASIC provided in an image forming apparatus according to the fifth embodiment.

Referring to FIG. 17, in the early stage of the flow of data processing upon outputting an image here, in the same way as in the case of the second embodiment explained with reference to FIG. 8, as shown by data flow D1, code data of drawing data stored in the hard disk drive (HDD) 107 are developed in the controller ASIC 101 and sent to the virtual memory (V-Mem) 108 via the processor SOC 103, and stored in the virtual memory (V-Mem) 108.

In the next stage, in the same way as in the case of the second embodiment explained with reference to FIG. 8, as shown by data flow D2, the code data of drawing data once stored in the virtual memory (V-Mem) 108 are read out in the data transfer arbitration processing by the FDMAC 801 installed in the controller ASIC 101 via the processor SOC 103, and the FDMAC 801 transfers the code data of drawing data to the image memory (I-Mem) 106 and stores the code data in the image memory (I-Mem) 106.

Furthermore, in the successive stage, as shown by data flow D3, after the code data of drawing data once stored in the image memory (I-Mem) 106 are read out by the expansion unit 802 installed in the controller ASIC 101, expansion processing is performed on the code data, and the processed data are written into the work memory (W-Mem) 115 as drawing image data.

Subsequently, in the successive stage, as shown by data flow D4, after the drawing image data once stored in the work memory (W-Mem) 115 are read out by the output unit 803 installed in the controller ASIC 101, transferred to the local memory (LM) 105 via the engine ASIC 102 and stored in the local memory (LM) 105, the engine ASIC 102 reads out the drawing image data from the local memory (LM) 105 and performs image data output to the plotter 110. Here, since the processing of writing in the data flow D3 and the processing of reading out in the data flow D4 are performed by using the work memory (W-Mem) 115, which is physically different from the image memory (I-Mem) 106, the competition in access privilege for the image memory (I-Mem) 106 is decentralized, and data transfer with higher efficiency can be executed. In any case, the data transfer flow using the image memory (I-Mem) 106 and the data transfer flow using the work memory (W-Mem) 115 are preferably decentralized, in the same way as the above-described case, so that each memory is accessed efficiently.

In this way, in the fifth embodiment shown in FIG. 17, the data processing includes data transfer arbitration processing outputting code data of drawing data that are preliminarily transferred from the virtual memory (V-Mem) 108 to the image memory (I-Mem) 106 in the data transfer arbitration processing by using the FDMAC 801, and then expansion processing and output processing are performed. In the data flow D4 here, in the same way as the data flow C3, although the data transfer is required to be performed, in synchronization with a plotter operation at the plotter 110 for writing every one line, for image data output for each line within a time period for one line, after the drawing image data related to the image data to be output are read from the virtual memory (V-Mem) 108, they are not required to pass through the PCIe CPU I/F 113 and the competition does not occur, so that there is not a possibility of occurrence of an under run error due to the data transfer performance being unsatisfied, as in the case of the data flow C3 in FIG. 16. Furthermore, in the same way as in the case of the fourth embodiment, since the optimum memory is determined upon executing the direct memory access control, based on the data flow of data transfer, competition in access privilege for a memory used for data transfer is decentralized, and data transfer can be always performed efficiently.

Moreover, since the data flow D1 here, in the same way as in the case of the data flow C1, includes a procedure for developing code data of drawing data first stored in the hard disk drive (HDD) 107 and transferred to the virtual memory (V-Mem) 108, it is possible to realize the procedure without changing software that controls it.

Sixth Embodiment

Figure 18:
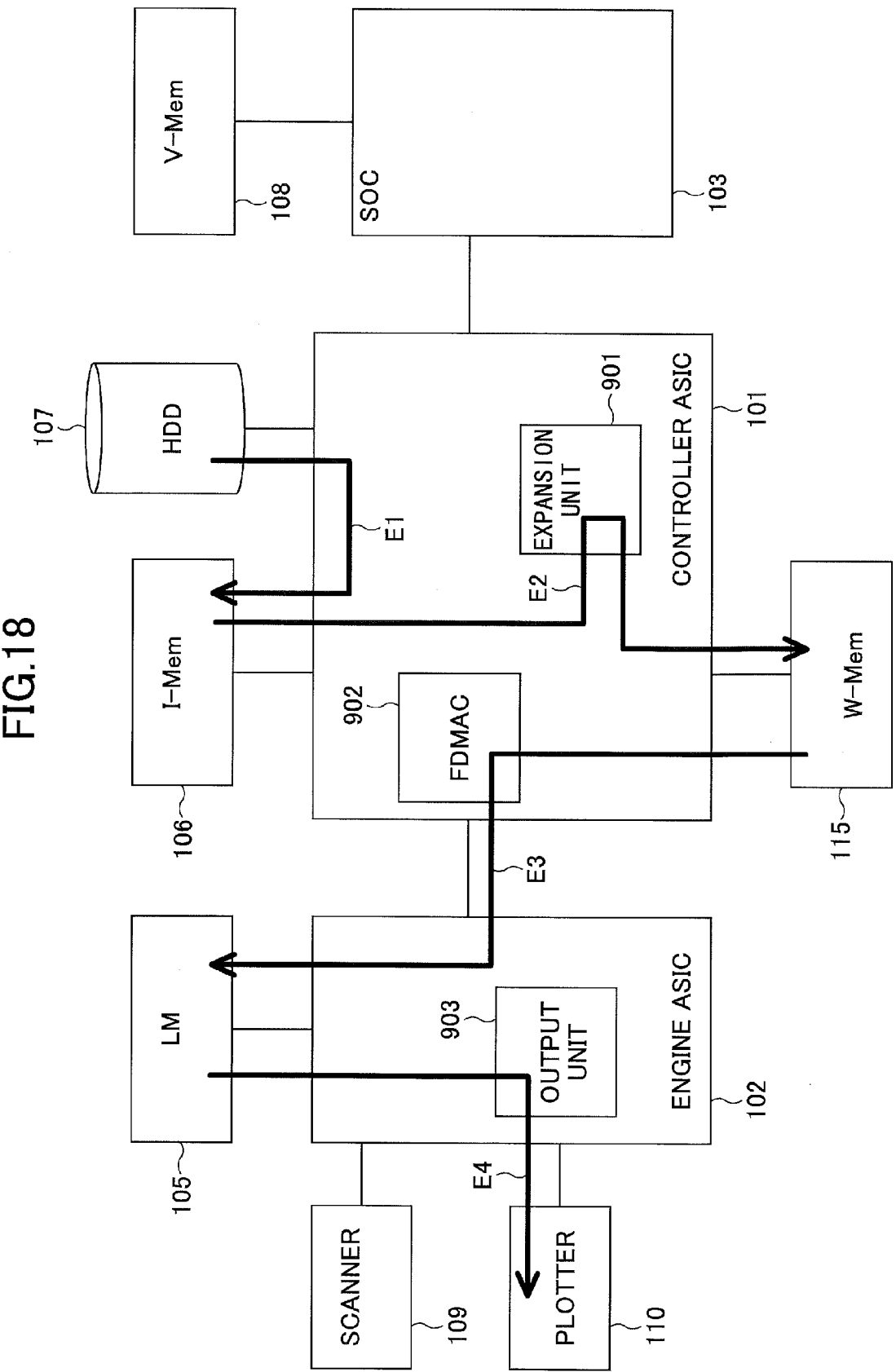
FIG. 18 is a functional block diagram illustrating an example of a flow of data processing including data transfer arbitration processing upon outputting an image to a plotter connected to an engine ASIC provided in an image forming apparatus according to a sixth embodiment.

FIG. 18 is a functional block diagram illustrating a flow of data processing including data transfer arbitration processing upon performing image data output to the plotter 110 connected to an engine ASIC 102 provided in an image forming apparatus according to a sixth embodiment.

Referring to FIG. 18, in the early stage of the flow of data processing upon performing image output here, as shown by data flow E1, the controller ASIC 101 reads out code data of drawing data stored in the hard disk drive (HDD) 107, develops the code data, sends it to the image memory (I-Mem) 106 and stores the processed data in the image memory (I-Mem) 106.

In the next stage, as shown by data flow E2, after the code data of drawing data once stored in the image memory (I-Mem) 106 are read out by the expansion unit 901 installed in the controller ASIC 101, expansion processing is performed on the code data and the processed data are written in the work memory (W-Mem) 115 as drawing image data.

Furthermore, in the successive stage, as shown by data flow E3, the drawing image data once stored in the work memory (W-Mem) 115 are read out by the FDMAC 902 installed in the controller ASIC 101, transferred to the engine ASIC 102, and the engine ASIC 102 stores the drawing image data into the local memory (LM) 105.

Subsequently, in the successive stage, as shown by data flow E4, after the drawing image data once stored in the local memory (LM) 105 are read out by the output unit 903 installed in the engine ASIC 102, image data are output to the plotter 110.

In the sixth embodiment, in the same way as in the case of the third embodiment, since the code data of drawing data stored in the hard disk drive (HDD) 107 in the first data flow E1 are developed and sent to the image memory (I-Mem) 106, it is necessary to change software for controlling it. However, since it is not necessary to use resources of the virtual memory (V-Mem) 108 and the PCIe CPU I/F 113, transfer performance is superior taking account of competition with other processing execution. Moreover, since the processing of writing in the data flow E2 and the processing of reading out in the data flow E3 are performed by using the work memory (W-Mem) 115, which is physically different from the image memory (I-Mem) 106, the competition in the access privilege for the image memory (I-Mem) 106 is decentralized, and data transfer with higher transfer efficiency can be executed. In any case, the data transfer flow using the image memory (I-Mem) 106 and the data transfer flow using the work memory (W-Mem) 115 are preferably decentralized so that each memory is accessed efficiently, in the same way as in the above-described case.

Moreover, in the sixth embodiment, in the same way as in the case of the third embodiment, although the capacity of the local memory (LM) 105 connected as a subordinate of control of the engine ASIC 102 can be considered to be insufficient, in such a case, depending on the usable capacity of the local memory (LM) 105, the FDMAC 903 may adjust the data amount to be transferred in the data transfer arbitration processing in the data flow E3. According to the above, drawing image data can be output effectively, as image data, from the local memory (LM) 105 to the plotter 110.

The data transfer arbitration processing function of the FDMAC 212, 401, 801 or 902 as the data transfer control unit in the image forming apparatus according to the respective above-described embodiments (fourth embodiment to sixth embodiment), can be reworded as a data transfer control method for image formation processing in the case where data transfer for image data is performed according to the direct memory access control from an arbitrary memory to another memory in various types of memories connected to various types of devices by the data transfer control unit in the image forming apparatus. In each of the above-described embodiments, the method corresponds to performing data transfer for image data according to the direct memory access control from an arbitrary memory to another memory, where the arbitrary memory includes the local memory (LM) 105 as a first memory connected as a subordinate of control to the engine ASIC 102 as a first device, the image memory (I-Mem) 106 as a second memory and the work memory (W-Mem) 115 as a third memory connected as subordinates of control to the controller ASIC 101 as a second device and the virtual memory (V-Mem) 108 as a third memory connected as a subordinate of control to the processor SOC 103 as a third device. The characteristic of the data transfer control method for image formation processing in the above case is to include the data transfer arbitration processing step, by the data transfer control unit (FDMAC 212, 401, 801 or 902) provided in the controller ASIC 101, for the data transfer according to the direct memory access control which is performed by cooperating with the engine ASIC 102 receiving instruction control from the processor SOC 103, for determining whether to transfer and an order of the transfer, based on a result of comparison for the preliminarily configured priorities, and for determining an optimum memory upon executing the direct memory access control based on a data flow of data transfer and conducting.

However, in the data transfer arbitration processing step here, data transfer according to the direct memory access control in response to a status of data transfer between the image memory (I-Mem) 106 and the virtual memory (V-Mem) 108 is preferably performed as the data transfer arbitration processing. Or, data transfer according to the direct memory access control based on the usable capacity of the local memory (LM) 105 is preferably performed as the data transfer arbitration processing. In any case, a data transfer control program for image formation processing that causes a computer to execute the above-described data transfer arbitration processing step of the data transfer control method for image formation processing is software.

Seventh Embodiment

Figure 19:
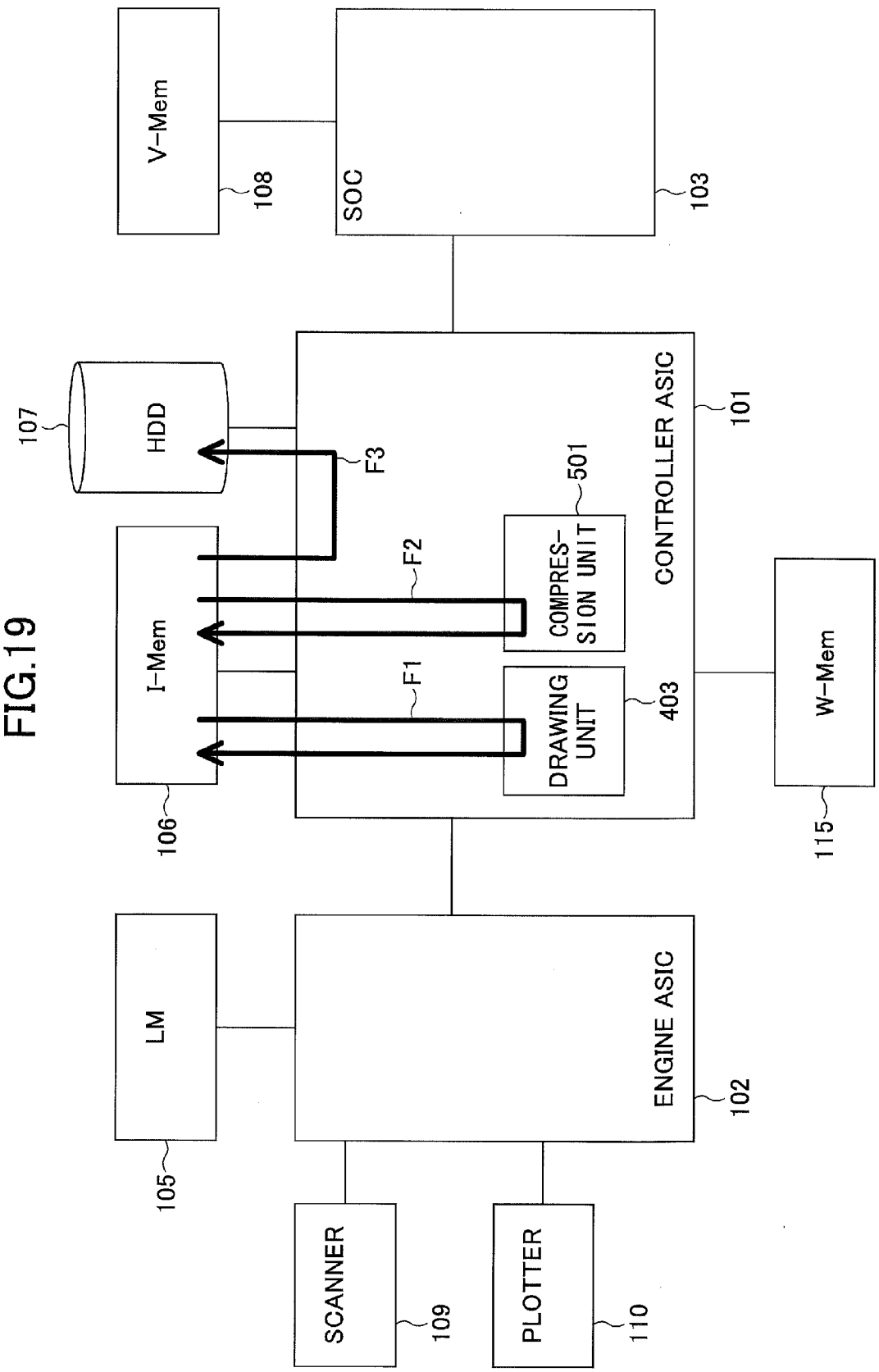
FIG. 19 is a functional block diagram illustrating an example of a part of a flow of data processing of printer drawing data in a controller ASIC provided in an image forming apparatus according to a seventh embodiment.

FIG. 19 is a functional block diagram illustrating a part of flow of data processing of printer drawing data in a controller ASIC 101 provided in an image forming apparatus according to a seventh embodiment.

Referring to FIG. 19, in the early stage of the flow of data processing of printer image data here, as shown by data flow F1, drawing data are written in the drawing data developing area in the image memory (I-Mem) 106 by the drawing unit 403 installed in the controller ASIC 101 performing drawing for image data based on a command list stored in the image memory (I-Mem) 106.

In the next stage, as shown by data flow F2, the drawing data in the drawing data developing area in the image memory (I-Mem) 106 are read out by the compression unit 501 installed in the controller ASIC 101, compression processing is performed on the drawing data and the processed data are written in the image memory (I-Mem) 106 as code data.

Furthermore, in the successive stage, as shown by data flow F3, the controller ASIC 101 transfers the code data once stored in the image memory (I-Mem) 106 to the hard disk drive (HDD) 107 and stores the code data in the hard disk drive (HDD) 107. In this way, in the data processing of printer drawing data in the image forming apparatus according to the seventh embodiment, the image memory (I-Mem) 106 is used.

Figure 20:
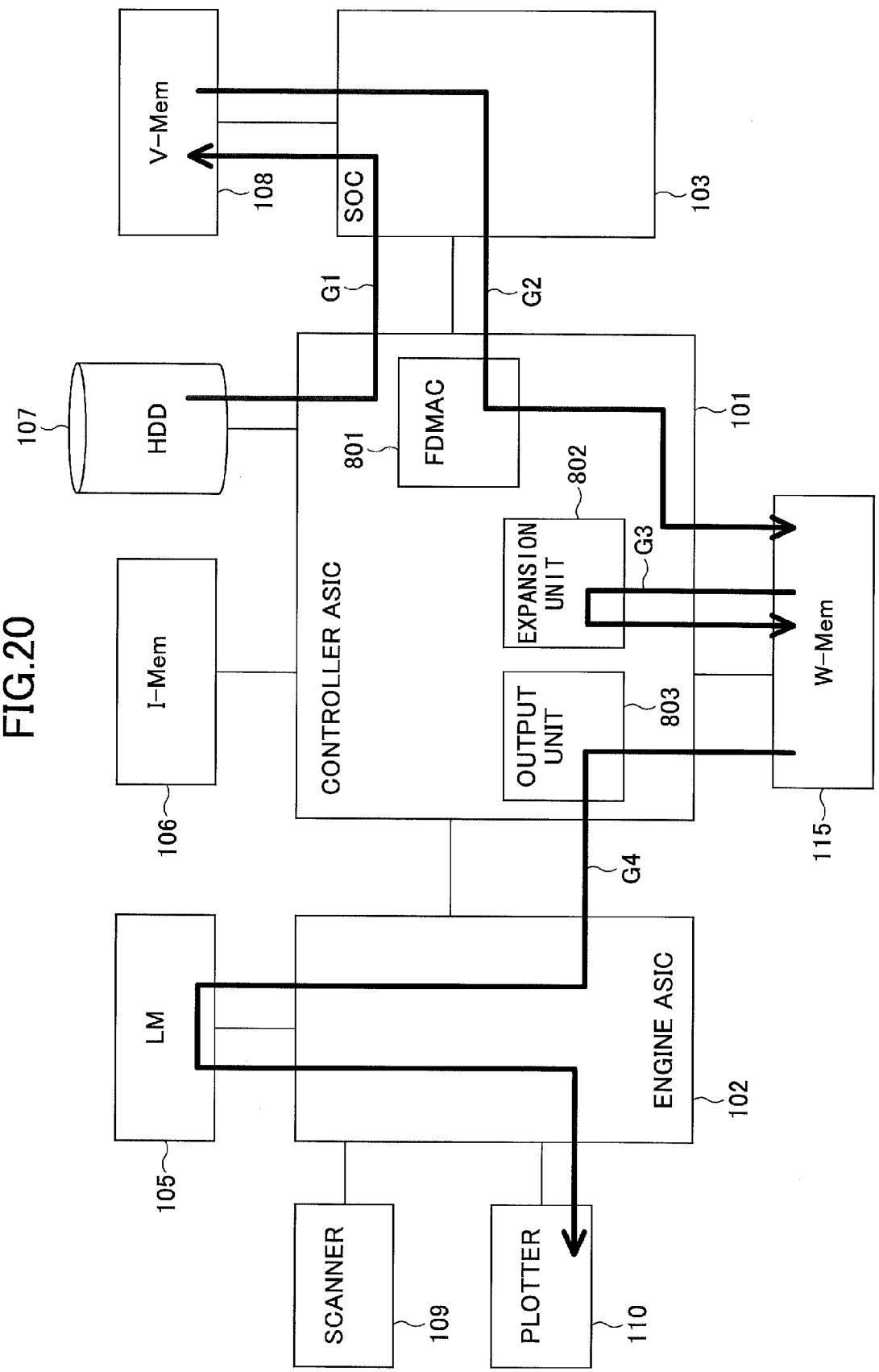
FIG. 20 is a functional block diagram illustrating an example of a flow of data processing including data transfer arbitration processing upon outputting an image to a plotter connected to an engine ASIC provided in the image forming apparatus shown in FIG. 19.

FIG. 20 is a functional block diagram illustrating a flow of data processing including data transfer arbitration processing upon performing image data output to the plotter 110 connected to the engine ASIC 102 provided in the image forming apparatus according to the seventh embodiment.

Referring to FIG. 20, in the early stage of the flow of data processing here, as shown by data flow G1, the code data of drawing data stored in the hard disk drive (HDD) 107 are developed in the controller ASIC 101 and transferred to the virtual memory (V-Mem) 108 via the processor SOC 103, and stored in the virtual memory (V-Mem) 108.

In the next stage, as shown by data flow G2, the code data of drawing data once stored in the virtual memory (V-Mem) 108 are read out by the FDMAC 801 installed in the controller ASIC 101 via the processor SOC 103, the FDMAC 801 performs data transfer arbitration processing for the code data of drawing data, transfers the processed data to the work memory (W-Mem) 115 and stores the processed data into the work memory (W-Mem) 115.

Furthermore, in the successive stage, as shown by data flow G3, after the code data of drawing data once stored in the work memory (W-Mem) 115 are read out by the expansion unit 802 installed in the controller ASIC 101, expansion processing is performed on the code data and the processed data are written into the work memory (W-Mem) 115 as drawing image data.

Subsequently, in the successive stage, as shown by data flow G4, after the drawing image data once stored in the work memory (W-Mem) 115 are read out by the output unit 803 installed in the controller ASIC 102, transferred to the local memory (LM) 105 via the engine ASIC 102 and stored in the local memory (LM) 105, the engine ASIC 102 reads out the drawing image data from the local memory (LM) 105 and performs image data output for the drawing image data to the plotter 110 as image data. In this way, in the data processing of image data output in the image forming apparatus according to the seventh embodiment, the work memory (W-Mem) 115 is used.

Figure 21:
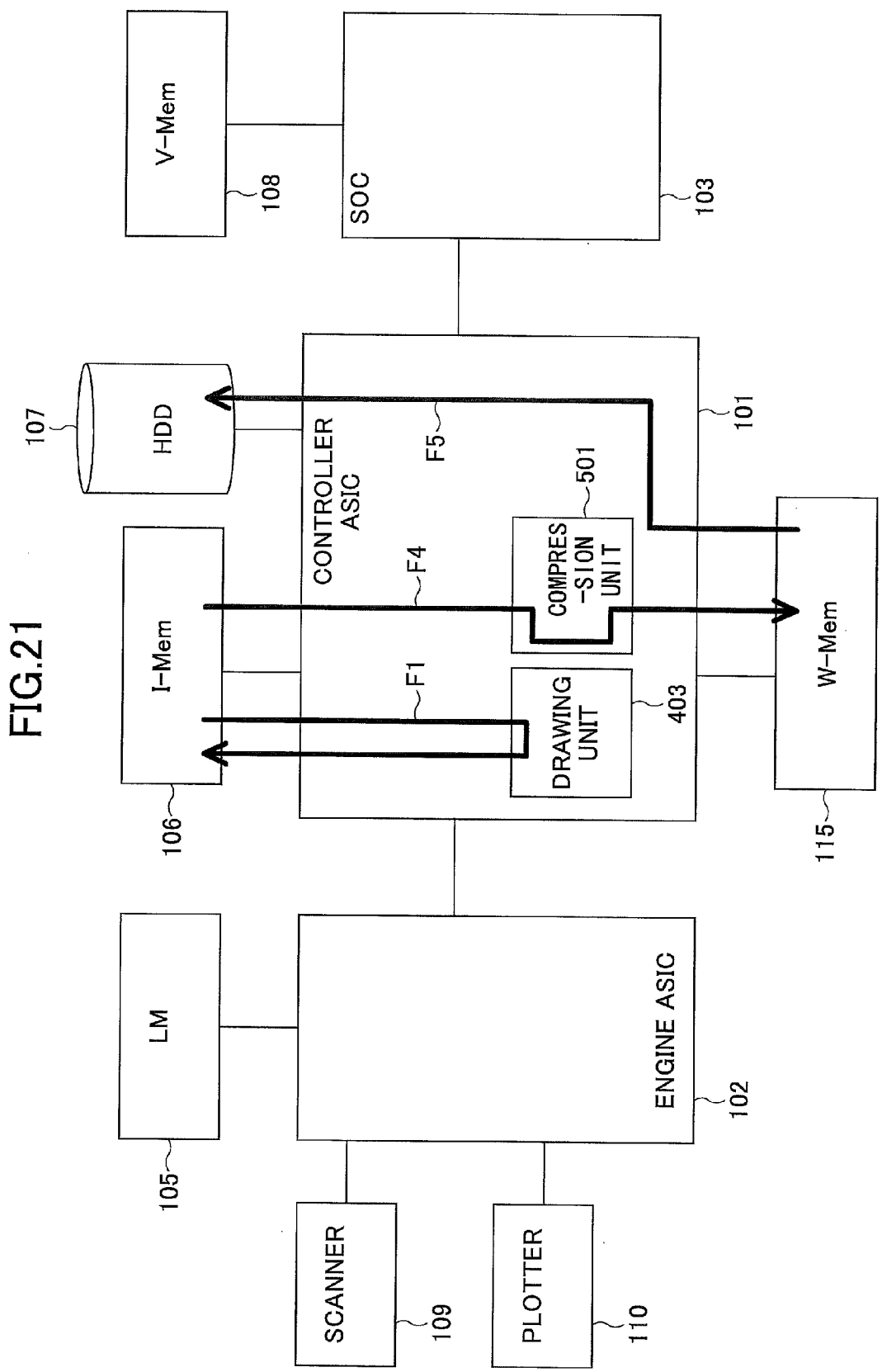
FIG. 21 is a functional block diagram illustrating an example of a flow of data processing of printer drawing data in the case where the data processing of printer drawing data at the controller ASIC provided in the image forming apparatus shown in FIG. 19 and data processing for outputting an image operate simultaneously and the data processing for outputting the image completes earlier.

FIG. 21 is a functional block diagram illustrating a flow of data processing of printer drawing data in the case where the data processing of printer drawing data at the controller ASIC 101 provided in the image forming apparatus according to the seventh embodiment and data processing of image output data operate simultaneously and the data processing of image output data completes earlier.

Referring to FIG. 21, in the early stage of the flow of data processing here, as shown by data flow F1, drawing data are written in the drawing data developing area in the image memory (I-Mem) 106 by the drawing unit 403 installed in the controller ASIC 101 performing drawing for image data based on the command list stored in the image memory (I-Mem) 106.

In the next stage, as shown by data flow F4, the drawing data in the drawing data developing area in the image memory (I-Mem) 106 are read out by the compression unit 501 installed in the controller ASIC 101, compression processing is performed on the drawing data and the processed data are written in the work memory (W-Mem) 115 as code data.

Furthermore, in the successive stage, as shown by data flow F5, the controller ASIC 101 transfers the code data once stored in the work memory (W-Mem) 115 to the hard disk drive (HDD) 107 and stores the code data in the hard disk drive (HDD) 107.

In the seventh embodiment, the data processing of printer drawing data shown by the data flow F1 uses at first the image memory (I-Mem) 106, the data processing of image data output shown by the data flows G1 to G4 use the work memory (W-Mem) 115, and by recognizing the state that the data processing of image output data is completed, a processing flow under execution is changed and memories, which are physically different from each other, are simultaneously used. According to the above, competition in access privilege for a memory can be decentralized, and efficient data transfer is performed.

Incidentally, a function of changing the memory which conducts the direct memory access control and is used in the data transfer, in the middle of the data transfer, according to a result of recognition for a transfer state of the data transfer, which is explained in the seventh embodiment, and conducting the data transfer (data transfer change function) can be applied in the data transfer arbitration processing by the data transfer control unit in the image forming apparatus explained in each of the other embodiments (first embodiment to sixth embodiment) as described above.

As described above, since various devices in the image forming apparatus explained in each of the embodiments (especially, detailed configuration of the controller ASIC 101 or the processor SOC 103) or the processing function thereof can be changed variously, the image forming apparatus, the control method for transferring data for image formation processing and the control program for transferring data for image formation processing according to the present invention are not limited to the embodiments.

Further, the present invention is not limited to these embodiments, but various variations and modifications may be made without departing from the scope of the present invention.

The present application is based on and claims the benefit of priority of Japanese Priority Applications No. 2014-010479 filed on Jan. 23, 2014 and No. 2014-110500 filed on May 28, 2014, the entire contents of which are hereby incorporated by reference.

What is claimed is:

1. An image forming apparatus comprising:
   a first device to which a first memory is connected;
   a second device to which a second memory is connected; and
   a third device to which a third memory is connected, the third device including a data transfer control unit configured to perform data transfers each for transferring data from one of the first to third memories to a destination memory of the first to third memories, according to a direct memory access control in cooperation with the first device and according to an instruction received from the second device, priorities and orders being assigned to the data transfers, wherein the data transfer control unit arbitrates the data transfers by changing the orders of the data transfers based on the priorities assigned to the data transfers and by changing the destination memory of at least one of the data transfers.

2. The image forming apparatus as claimed in claim 1, wherein a fourth memory is connected to the third device, and the data transfer control unit is configured to perform the data transfers each for transferring data from the one of the first to fourth memories to the destination memory of the first to fourth memories.

3. The image forming apparatus as claimed in claim 1, wherein the data transfer control unit is configured to change the orders of the data transfers and change the destination memory of at least one of the data transfers based on a data transfer status between the second memory and the third memory.

4. The image forming apparatus as claimed in claim 1, wherein the data transfer control unit is configured to change the destination memory of at least one of the data transfers based on a usable capacity of the first memory.

5. The image forming apparatus as claimed in claim 1, wherein the data transfer control unit is configured to change the destination memory of at least one of the data transfers while performing the data transfers based on a transfer state of the data transfers.

6. A control method for controlling data transfers each for transferring data from one of a first memory connected to a first device, a second memory connected to a second device and a third memory connected to a third device to a destination memory of the first to third memories, according to a direct memory access control in cooperation with the first device and according to an instruction received from the second device, by a data transfer control unit provided in the third device, wherein priorities and orders are assigned to the data transfers, the method comprising:
    arbitrating the data transfers by changing the orders of the data transfers based on the priorities assigned to the data transfers and by changing the destination memory of at least one of the data transfers.

7. The control method as claimed in claim 6, wherein a fourth memory is connected to the third device, and the data transfer control unit transfers data from the one of the first to fourth memories to the destination memory of the first to fourth memories.

8. The control method as claimed in claim 6, wherein upon arbitrating the data transfers, the orders of the data transfers and the destination memory of at least one of the data transfers are changed based on a data transfer status between the second memory and the third memory.

9. The control method as claimed in claim 6, wherein upon arbitrating the data transfers, the destination memory of at least one of the data transfers is changed based on a usable capacity of the first memory.

10. The control method as claimed in claim 6, wherein upon arbitrating the data transfers, the destination memory of at least one of the data transfers is changed while performing the data transfers based on a transfer state of the data transfers.

11. A non-transitory computer-readable storage medium storing a program for causing a computer to execute a process of controlling data transfers each for transferring data from one of a first memory connected to a first device, a second memory connected to a second device and a third memory connected to a third device to a destination memory of the first to third memories, according to a direct memory access control in cooperation with the first device and according to an instruction received from the second device, wherein priorities and orders are assigned to the data transfers, the process comprising:
    an arbitration step of arbitrating the data transfers by changing the orders of the data transfers based on the priorities assigned to the data transfers and by changing the destination memory of at least one of the data transfers.

* * * * *